United States Patent
Kim et al.

(10) Patent No.: US 10,157,272 B2
(45) Date of Patent: Dec. 18, 2018

(54) SYSTEMS AND METHODS FOR EVALUATING STRENGTH OF AN AUDIO PASSWORD

(71) Applicant: QUALCOMM Incorporated, San Diego, CA (US)

(72) Inventors: Lae-Hoon Kim, San Diego, CA (US); Juhan Nam, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 14/172,619

(22) Filed: Feb. 4, 2014

(65) Prior Publication Data

US 2015/0220715 A1    Aug. 6, 2015

(51) Int. Cl.
| | | |
|---|---|---|
| G06F 7/04 | (2006.01) | |
| G06F 12/00 | (2006.01) | |
| G06F 12/14 | (2006.01) | |
| G11C 7/00 | (2006.01) | |
| G06F 21/32 | (2013.01) | |
| G06F 3/16 | (2006.01) | |
| G06F 21/46 | (2013.01) | |
| G10L 15/18 | (2013.01) | |

(52) U.S. Cl.
CPC .............. *G06F 21/32* (2013.01); *G06F 3/16* (2013.01); *G06F 21/46* (2013.01); *G10L 15/18* (2013.01)

(58) Field of Classification Search
CPC ................................. G06F 21/32; G06F 21/16
See application file for complete search history.

(56) References Cited

U.S. PATENT DOCUMENTS

| | | | | |
|---|---|---|---|---|
| 5,450,524 A | * | 9/1995 | Rissanen | .................. G06F 3/16 704/243 |
| 7,409,343 B2 | | 8/2008 | Charlet | |
| 8,099,288 B2 | | 1/2012 | Zhang et al. | |
| 8,200,978 B2 | * | 6/2012 | Ll | .......................... G06F 21/34 380/44 |
| 8,504,366 B2 | * | 8/2013 | Hagai | ................. G06F 17/5045 381/56 |

(Continued)

FOREIGN PATENT DOCUMENTS

| | | |
|---|---|---|
| CN | 1963917 A | 5/2007 |
| CN | 101467204 A | 6/2009 |
| WO | WO-2013109330 A2 | 7/2013 |

OTHER PUBLICATIONS

International Search Report and Written Opinion—PCT/US2015/013126—ISA/EPO—Apr. 2, 2015.

*Primary Examiner* — Mahfuzur Rahman
*Assistant Examiner* — Darshan I Dhruv
(74) *Attorney, Agent, or Firm* — Austin Rapp & Hardman, P.C.

(57) ABSTRACT

A method for evaluating strength of an audio password by an electronic device is described. The method includes obtaining an audio signal captured by one or more microphones. The audio signal includes an audio password. The method also includes evaluating the strength of the audio password based on measuring one or more unique characteristics of the audio signal. The method further includes informing a user that the audio password is weak based on the evaluation of the strength of the audio password.

31 Claims, 14 Drawing Sheets

(56) References Cited

U.S. PATENT DOCUMENTS

| | | | |
|---|---|---|---|
| 8,863,260 B2* | 10/2014 | Chougle | G06F 21/31 713/168 |
| 2002/0184538 A1 | 12/2002 | Sugimura et al. | |
| 2004/0081047 A1* | 4/2004 | Baik | G06F 21/31 369/53.21 |
| 2004/0250139 A1* | 12/2004 | Hurley | G06F 21/46 726/7 |
| 2007/0036289 A1* | 2/2007 | Fu | G07C 9/00158 379/88.02 |
| 2007/0055500 A1* | 3/2007 | Bilobrov | G06F 17/30743 704/217 |
| 2008/0195389 A1* | 8/2008 | Zhang | G10L 17/14 704/246 |
| 2008/0244272 A1 | 10/2008 | Hsieh et al. | |
| 2009/0158406 A1* | 6/2009 | Jancula | G06F 21/46 726/5 |
| 2009/0313696 A1* | 12/2009 | Himberger | G06F 21/46 726/22 |
| 2011/0000360 A1* | 1/2011 | Saino | G10H 1/0008 84/622 |
| 2011/0213615 A1* | 9/2011 | Summerfield | G06F 21/32 704/246 |
| 2012/0066650 A1* | 3/2012 | Tirpak | G06F 21/36 715/863 |
| 2012/0284783 A1* | 11/2012 | Jakobsson | G06F 21/46 726/6 |
| 2013/0166295 A1 | 6/2013 | Shriberg et al. | |
| 2013/0166296 A1* | 6/2013 | Scheffer | G10L 17/02 704/243 |
| 2013/0227678 A1 | 8/2013 | Kang et al. | |
| 2013/0238334 A1 | 9/2013 | Ma et al. | |
| 2013/0238336 A1 | 9/2013 | Sung et al. | |
| 2013/0262356 A1 | 10/2013 | Bonastre et al. | |
| 2013/0283337 A1* | 10/2013 | Schechter | G06F 21/46 726/1 |
| 2013/0325473 A1 | 12/2013 | Larcher et al. | |
| 2014/0012586 A1* | 1/2014 | Rubin | G10L 25/51 704/273 |
| 2014/0042586 A1* | 2/2014 | Lee et al. | 257/506 |
| 2014/0188468 A1* | 7/2014 | Dyrmovskiy | G10L 17/04 704/235 |
| 2014/0373088 A1* | 12/2014 | Aggarwal | G06F 21/46 726/1 |
| 2014/0379525 A1* | 12/2014 | Timem | G06F 21/32 705/26.41 |
| 2015/0081301 A1* | 3/2015 | Nicholson | G10L 17/24 704/249 |

* cited by examiner

SYSTEMS AND METHODS FOR EVALUATING STRENGTH OF AN AUDIO PASSWORD

TECHNICAL FIELD

The present disclosure relates generally to electronic devices. More specifically, the present disclosure relates to systems and methods for evaluating strength of an audio password.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cellular phones, smartphones, audio recorders, camcorders, computers, etc.) utilize audio signals. These electronic devices may capture, encode, store and/or transmit the audio signals. For example, a smartphone may obtain, encode and transmit a speech signal for a phone call, while another smartphone may receive and decode the speech signal.

However, particular challenges may arise for electronic devices that utilize audio signals for security purposes. For example, many audio signals may be insufficient to adequately secure electronic device access. As can be observed from this discussion, systems and methods that improve security may be beneficial.

SUMMARY

A method for evaluating strength of an audio password by an electronic device is described. The method includes obtaining an audio signal captured by one or more microphones. The audio signal includes an audio password. The method also includes evaluating the strength of the audio password based on measuring one or more unique characteristics of the audio signal. The method further includes informing a user that the audio password is weak based on the evaluation of the strength of the audio password. The audio signal may include at least one speech component. Measuring one or more unique characteristics of the audio signal may be based on a generic speech model.

Informing the user may include displaying a label associated with the strength of the audio password. Informing the user may include displaying a password strength score. Informing the user may include displaying at least one candidate speech component.

The method may include comparing a password strength score with another value. The other value may be a threshold or a previous password strength score.

The method may include obtaining at least one additional authentication input. The method may include degrading at least one of the audio signal and the additional authentication input. The method may include updating a generic speech model based on one or more of a geographical location, a user age, a user gender, a user language and a regional dialect.

An electronic device for evaluating strength of an audio password is also described. The electronic device includes one or more microphones that capture an audio signal. The audio signal includes an audio password. The electronic device also includes password evaluation circuitry coupled to the one or more microphones. The password evaluation circuitry evaluates the strength of the audio password based on measuring one or more unique characteristics of the audio signal. The electronic device further includes password feedback circuitry coupled to the password evaluation circuitry. The password feedback circuitry informs a user that the audio password is weak based on the evaluation of the strength of the audio password.

A computer-program product for evaluating strength of an audio password is also described. The computer-program product includes a non-transitory tangible computer-readable medium with instructions thereon. The instructions include code for causing an electronic device to obtain an audio signal captured by one or more microphones. The audio signal includes an audio password. The instructions also include code for causing the electronic device to evaluate the strength of the audio password based on measuring one or more unique characteristics of the audio signal. The instructions further include code for causing the electronic device to inform a user that the audio password is weak based on the evaluation of the strength of the audio password.

An apparatus for evaluating strength of an audio password is also described. The apparatus includes means for obtaining an audio signal. The audio signal includes an audio password. The apparatus also includes means for evaluating the strength of the audio password based on measuring one or more unique characteristics of the audio signal. The apparatus further includes means for informing a user that the audio password is weak based on the evaluation of the strength of the audio password.

DETAILED DESCRIPTION

Some configurations of the systems and methods disclosed herein provide password strength evaluation and suggestion for speech-based biometric authentication. When using voice for the purpose of authentication, a user may want to set a password to utter. However, it may be difficult to know whether the password would be unique enough in terms of voice timbre such that anyone else cannot break the system when the same password happens to be uttered. It would be much better if the uttered password contains a user's own distinct biometric differentiation than an arbitrarily set password. If additional means is/are available, they may be properly utilized to strengthen the security.

The systems and methods disclosed herein may provide approaches to evaluate the strength of "uniqueness" so that a user may choose a unique enough password. In some configurations, the systems and methods disclosed herein may suggest some candidates using the utterances that preserve a user's enhanced uniqueness. The systems and methods disclosed herein may suggest some candidates, not only by using the utterances that preserve a user's own enhanced uniqueness, but also by leveraging one or more other available modalities in some configurations.

Some speaker verification systems train speaker models by adapting speaker data to a universal background model (UBM). In the phase of verification, the likelihood ratio of observed frames between the speaker models and UBM may be computed. A summary statistic over whole utterance/sentence frames may be calculated to determine if the speech frames are from the true speaker. However, "local" likelihood per utterance/phoneme/syllable or even per frame indicates that some have high discrimination, but some do not. The portion without much discrimination may be interpreted as the portion explained from other models as well, meaning that it would contaminate the verification performance. Or, it may be explained as unseen data by the target model, meaning that it may be difficult to be repeated by a user. Accordingly, it may be beneficial to have a password that is both strong enough and easily reproducible.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
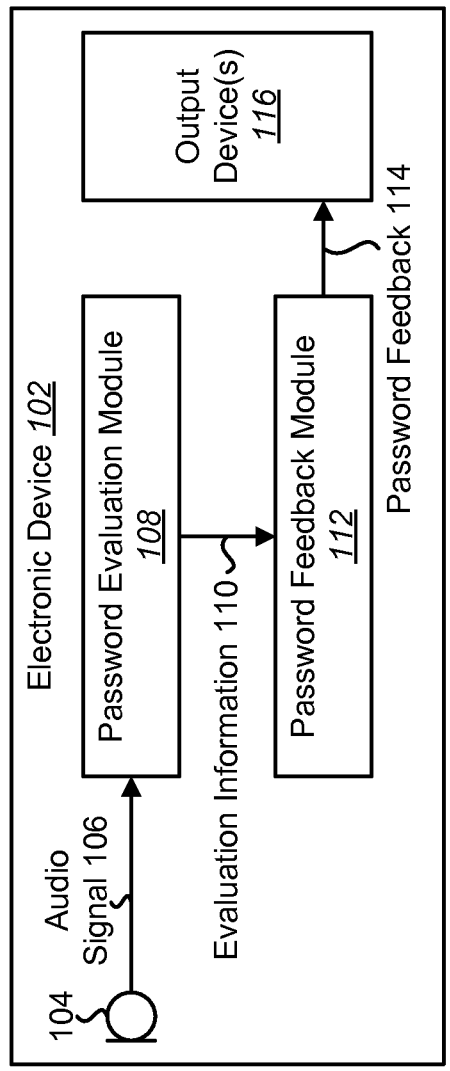
FIG. 1 is a block diagram illustrating one configuration of an electronic device in which systems and methods for evaluating strength of an audio password may be implemented.

FIG. 1 is a block diagram illustrating one configuration of an electronic device 102 in which systems and methods for evaluating strength of an audio password may be implemented. Examples of the electronic device 102 include smartphones, cellular phones, tablet devices, computers (e.g., laptop computers, desktop computers, etc.), gaming systems, electronic automobile consoles, personal digital assistants (PDAs), etc.

The electronic device 102 includes one or more microphones 104, a password evaluation module 108, a password feedback module 112 and one or more output devices 116. The microphone(s) 104 may be one or more transducers that convert acoustic signals into electronic signals. The one or more output devices 116 may be devices for providing output from the electronic device 102. Examples of the one or more output devices 116 include displays (e.g., display panels, touchscreens), speakers (e.g., transducers that convert electronic signals into acoustic signals), haptic devices (e.g., devices that produce force, motion and/or vibration), etc. A "module" may be implemented in hardware (e.g., circuitry) or in a combination of hardware and software (e.g., a processor with instructions). For example, the password evaluation module 108 and/or the password feedback module 112 may be implemented in hardware or in a combination of hardware and software.

The one or more microphones 104 may be coupled to the password evaluation module 108. The password evaluation module 108 may be coupled to the password feedback module 112. The password feedback module 112 may be coupled to the one or more output devices 116. As used herein, the term "couple" and related terms may mean that one component is directly connected (without intervening components, for example) or indirectly connected (with one or more intervening components, for example) to another component. Arrows and/or lines depicted in the Figures may denote couplings.

The one or more microphones 104 may capture an audio signal 106. For example, the one or more microphones 104 may capture an acoustic signal and convert it into an electronic audio signal 106. The audio signal 106 may include an audio password. The audio password may include one or more sounds (e.g., one or more speech components such as phonemes, syllables, words, phrases, sentences, utterances, etc.) for verifying a user's identity. For example, the audio password may include one or more characteristics (e.g., biometric characteristics, timbre, etc.) that may be used to identify a user. The audio signal 106 may be provided to the password evaluation module 108.

The password evaluation module 108 may obtain (e.g., receive) the audio signal 106 captured by the one or more microphones 104. As described above, the audio signal 106 may include an audio password. The password evaluation module 108 may evaluate the strength of the audio password based on measuring one or more unique characteristics of the audio signal 106. Password "strength" may be a property that indicates how secure the password is. For instance, a strong audio password (e.g., an audio password with high strength) may be very difficult or nearly impossible for an imposter to imitate or replicate naturally, where the imposter is incorrectly identified as the true user. However, a weak audio password (e.g., an audio password with low strength) may be easier for an imposter to imitate or replicate naturally, where the imposter is incorrectly identified as the true user. In some configurations, audio password strength may be expressed in terms of uniqueness. For example, the more unique the one or more speech components of an audio password are, the stronger the password is. However, the less unique the one or more speech components of an audio password are, the weaker the password is. Accordingly, audio password strength may be quantified and range in degree from weak to strong. For instance, more unique speech components may be scored more highly (e.g., more strongly) than less unique speech components.

In some configurations, the password evaluation module 108 may evaluate the strength of one or more speech components (e.g., utterances, phonemes, etc.) of the audio password with a degree of uniqueness or distinction from one or more generic speech models (e.g., UBM). A generic speech model may be a speech model (e.g., statistical speech model) that represents the speech of a group of people. One or more UBMs are examples of the generic speech model.

In some configurations, the password evaluation module 108 may utilize multiple generic speech models (e.g., UBMs). For example, the multiple generic speech models may be utilized (e.g., selected and/or adapted, etc.) based on a user's input and/or characteristics such as geographical location (e.g., zip code, city, county, state, country, etc.), gender, age, language, regional dialect, etc. The user's characteristics may impact the acoustical characteristics of the user's speech. In some configurations, if the user-provided information is not matched with the stored generic speech model(s), then the electronic device 102 may notify the user and/or a proper model may be used instead under user's acknowledgement. By using more specifically matched generic speech models (e.g., UBMs) to measure the uniqueness, the electronic device 102 (e.g., password evaluation module 108) may provide more accurate uniqueness measures and/or scores. In some configurations, the electronic device 102 (e.g., password evaluation module 108) may update the corresponding generic speech model(s) (e.g., UBMs) based on the participating one or more users' data.

The password evaluation module 108 may evaluate the strength of the audio password based on measuring one or more characteristics (e.g., unique characteristics) of the audio signal 106 as follows, in some configurations. The password evaluation module 108 may extract one or more features (e.g., feature vectors) from the audio signal 106. For example, the password evaluation module 108 may determine one or more Mel-Frequency Cepstral Coefficients (MFCC) based on the audio signal 106. In some configurations, the MFCCs may be coefficients obtained by applying a discrete cosine transform (DCT) on a log magnitude of a mel-frequency smoothed spectrum of the audio signal 106. In accordance with the systems and methods disclosed herein, any or all feature(s) that can be utilized for speaker/speech recognition may be extracted for use. MFCCs are given as an example because they may be a relevant feature vector used in such applications. In some configurations, the feature(s) extracted and/or utilized in accordance with the systems and methods disclosed herein may not be confined to deterministic features (meaning that regardless of the data, the way in which the feature(s) are obtained may be fixed, for example). For instance, the feature vectors may be extracted (e.g., learned) using data-driven methods such as deep neural networks in some approaches.

The password evaluation module 108 may obtain a uniqueness measure of the audio signal 106 based on one or more generic speech models (e.g., UMBs). The uniqueness measure may indicate uniqueness over the audio signal 106 (e.g., audio password). For example, the uniqueness measure may vary over the time period of the audio signal 106 (e.g., audio password). In some configurations, the uniqueness measure may be obtained over each speech component (e.g., phoneme, syllable, word, etc.) and/or frame of the audio signal 106 (e.g., audio password). In some configurations, the audio signal 106 (e.g., input wave) may be converted to feature vectors (e.g., MFCCs), which may be utilized to obtain the uniqueness measure and/or password strength score.

In some configurations, the uniqueness measure may be a likelihood ratio between the audio signal 106 and the generic speech model(s). For example, the likelihood ratio may be determined in accordance with Equation (1).

$$\sum_t \log(p(X \mid \lambda_{target})) - \log(p(X \mid \lambda_{generic})) \qquad (1)$$

In Equation (1), t is time, X is the audio signal (or feature vector(s) based on the audio signal, for example), $\lambda_{target}$ is the target (e.g., true user) model, $\lambda_{generic}$ is the generic speech model(s) (e.g., UBM(s)), $p(X|\lambda_{target})$ is the probability that X corresponds to the true user and $p(X|\lambda_{generic})$ is the probability that X corresponds to a generic user (e.g., imposter, non-true user, etc.). The generic term (e.g., $\lambda_{generic}$) may be a model of an imposter and/or non-true user, etc. The model of the imposter and/or non-true user may be utilized for comparing actual user models. Comparing actual user models may be computationally intensive and/or exhaustive, so some hierarchy may be utilized to define a search range (e.g., gender, age, location, etc.). Additionally or alternatively, the generic term (e.g., $\lambda_{generic}$) may be a non-user-dependent model (e.g., a generic speaker model). The non-user-dependent model may be utilized for simplifying the comparison, in which only one model may be needed for comparison. It should be noted that the generic model (e.g., $\lambda_{generic}$) in the electronic device 102 and/or in a remote device (e.g., remote server) may be updated (if needed, for instance). In some examples, the generic model may be updated by updating one or more model parameters (e.g., mean and/or mixing weights). Updating may be performed periodically (e.g., regularly) and/or aperiodically (e.g., on demand, based on an update determination, etc.).

In other configurations, the uniqueness measure (e.g., likelihood ratio) may be generalized as an arbitrary non-decreasing function $f$. For example, the uniqueness measure may be determined in accordance with Equation (2).

$$\sum_t f\left(\frac{p(X \mid \lambda_{target})}{p(X \mid \lambda_{generic})}\right) \qquad (2)$$

In some configurations, the generic speech model may be obtained and/or updated as follows. The generic speech model may model the speech of other users (than the true user, for example). In some configurations, the generic speech model may be an "always adapting model" of other users. Additionally or alternatively, the audio signal 106 (e.g., audio password) may be compared (by the electronic device 102 or a remote device, for example) against the models for other users, if they are using the same system (with the same remote server, for example). This may be performed instead of comparing the audio signal 106 against the UBM in some configurations.

Complexity may be one issue with this approach, though complexity may be lessened by narrowing down the search range. For example, basic information retrieval may be performed first, such as gender, age, language including regional dialects, etc. Additionally or alternatively, the electronic device 102 or a remote device (e.g., server) may attempt to locate a user's physical region of residence or some history of it. The audio signal 106 (e.g., audio password) may then be compared with a much smaller set of actual models for others with the same category (e.g., of gender, age, language, regional dialect, physical region, etc.), which may be static or dynamically changing. The electronic device 102 may provide (to the user) different suggestions for the password dynamically (depending on the region of residence or language he/she speaks, etc., for example).

In some configurations, the generic speech model may be based on multiple models. For example, the generic speech model may be based on clustering multiple UBMs based on Gaussian Mixture Model (GMM) states with high likelihood updated from an original single UBM. Additionally or alternatively, the generic speech model may be based on grouping based on physical region may be used (e.g., 92121, San Diego) and the user's model may be compared with the models for the people in the same region.

The password evaluation module 108 may determine one or more password strength scores based on the uniqueness measure. The password strength score(s) may indicate the strength of the audio password. For example, a password strength score may be an indication of the strength of the entire audio password. Additionally or alternatively, one or more sublevel password strength scores may be determined. In some configurations, the password strength score may be determined based on a summary statistic of the uniqueness measure.

In some configurations, the password strength score may be the uniqueness measure itself. Additionally or alternatively, determining the password strength score may include combining (e.g., summing) portions of the uniqueness measure. Additionally or alternatively, determining the password strength score may include mapping the uniqueness measure, mapping one or more portions of the uniqueness measure and/or mapping one or more summary statistics to numeric value(s) (e.g., a percentage), to word(s) (e.g., "weak," "moderate," "strong," etc.) and/or to some other indicator(s) (e.g., a color, a shape, etc.).

In some configurations, the password strength score may be the uniqueness measure. For example, Equation (1) and/or Equation (2) may be utilized for obtaining the password strength score. It should be noted that t may determine the length of the summary statistic. For example, some small constant t (e.g., a frame length) may be utilized to obtain the uniqueness measure (e.g., continuous score). One example of the uniqueness measure obtained with a small constant t is described in connection with FIG. 3.

In some configurations, determining the password strength score may include combining (e.g., summing, averaging, etc.) portions of the uniqueness measure. For example, the password evaluation module 108 may combine (e.g., sum, average, etc.) over a certain period of the uniqueness measure to determine the password strength score. For instance, the password evaluation module 108 may use the entire uniqueness measure or one or more long enough time frames of the uniqueness measure to get a smoothed score. This smoothed score may be one example of the password strength score.

In some configurations, if t is long enough, the password strength score may be the uniqueness measure itself without combining portions of the uniqueness measure. However, it may be beneficial to obtain portions of the uniqueness measure that correspond to one or more speech components (at the phoneme level, for example), which may be utilized to recommend and/or access speech component-level (e.g., phoneme-level) uniqueness. These portions of the uniqueness measure may then be combined to determine an overall password strength score.

In some configurations, one or more sublevel password strengths may be obtained. For example, each of the sublevel password strengths may be or may be based on the portions of the uniqueness measure. This may be beneficial to narrow the uniqueness measure down to a speech-component (e.g., phoneme) level. Additionally or alternatively, the password evaluation module 108 may obtain one or more sublevel password strengths by combining (e.g., summing, averaging, etc.) portions of the uniqueness measure (but not all of the uniqueness measure, for instance). For example, the password evaluation module 108 may combine portions of the uniqueness measure that respectively correspond to speech components. In one approach, the password evaluation module 108 may sum and/or average portions of the uniqueness measure corresponding to phonemes within a larger set (e.g., word, phrase, sentence, etc.). In this way, one or more higher-level (e.g., word-level, phrase-level, sentence-level, etc.) password strength scores may be determined.

In some configurations, determining the password strength score may include expressing the password strength score(s) as and/or mapping the password strength score(s) to a numeric value (e.g., 10%, 43%, 65%, 90%, etc.), a word (e.g., "weak," "moderate," "strong," etc.) and/or some other indicator (e.g., red, yellow, green, etc.). For example, the password evaluation module 108 may multiply a summary statistic of the uniqueness measure (and/or portions of the uniqueness measure) by some factor (e.g., 100) to determine the password strength score. Additionally or alternatively, the password evaluation module 108 may select (e.g., look up) a particular numeric value, a word and/or some other indicator based on the uniqueness measure, portions of the uniqueness measure and/or a summary statistic of the uniqueness measure to determine the password strength score. For instance, the password evaluation module 108 may determine the password strength score(s) based on the uniqueness measure, one or portions of the uniqueness measure and/or one or more quantities (e.g., sums, averages, statistics, etc.) based on the uniqueness measure. One or more of these quantities may be compared to one or more thresholds to determine the password strength score(s) and/or the password strength score(s) may be looked up (in a table, for example) based on one or more of these quantities.

In some configurations, the password evaluation module 108 may determine whether the audio password is sufficiently strong (according to an arbitrary probability, according to user preference and/or enough to make it very unlikely for an imposter to pass as the true user by uttering the audio password, for example). For example, the password evaluation module 108 may compare the password strength score with a value. For example, the value may be a previous password strength score and/or a threshold. The value may be static (e.g., predetermined) and/or dynamic. In some configurations, the value may be set by a manufacturer and/or configured by a user. The value may be expressed as a numeric value (e.g., 60%, 80%, 90%, etc.) and/or as a word (e.g., "moderate," "strong," etc.). The value may establish a decision point that delineates whether a password strength is deemed sufficient or insufficient.

In some configurations, the password strength score may take into account one or more additional authentication inputs in combination with the audio password. For example, if the audio password is used in conjunction with an alphanumeric code or fingerprint scan, the strength score may reflect additional authentication strength offered by the combination of the audio password and the one or more additional authentication inputs, if utilized.

In some configurations, the electronic device 102 (e.g., password evaluation module 108) may receive one or more additional authentication inputs. For example, some configurations may allow for the use of other modalities such as video, gyro/accelerometer sensors, keyboards, fingerprint sensor, etc. In some approaches, one or more such modalities may be utilized for one or more parts (of a phrase, sentence, etc.) with less uniqueness or discrimination strength. For example, when a user utters a word with low uniqueness (e.g., the word "school" with a less discriminative score), the electronic device 102 may obtain or receive one or more additional authentication inputs.

Examples of the one or more additional authentication inputs are given as follows. In configurations where the electronic device 102 has gesture recognition, the electronic device 102 may receive a gesture (e.g., a touchscreen pattern, touchpad pattern, visual hand gesture pattern captured by a camera, etc.) input by the user. The gesture may be user-created or predefined. In configurations where the electronic device 102 includes a camera, the electronic device 102 may capture one or more images of a user, such as a user's face, eyes, nose, lips, face shape and/or more unique information such as an iris with the audio signal 106. For instance, a camera included in the electronic device 102 may be pointed (by a user, for example) to capture all or part of the user's face.

In configurations where the electronic device 102 includes one or more motion and/or orientation sensors (e.g., gyros, accelerometers, tilt sensors, etc.), the electronic device 102 may obtain motion and/or orientation information. For example, a user may orient and/or move the electronic device 102 (e.g., phone) in a user-created or predefined way. For instance, the electronic device 102 may encode gyro and/or accelerometer sensor information together with the audio signal 106.

In configurations where the electronic device 102 includes a physical or software keypad or keyboard, the electronic device 102 may receive a numeric code, text and/or alphanumeric string (typed by the user, for example) together with the audio signal 106. In configurations where the electronic device 102 includes a fingerprint sensor, the electronic device 102 may receive a fingerprint (when the user touches or holds the fingerprint sensor, for example).

In configurations where the electronic device 102 includes multiple microphones 104, the electronic device 102 may obtain (e.g., receive and/or determine) spatial directionality information of the audio signal 106. For example, the user may speak an audio password in a sequence of directions (e.g., top, bottom, left, right, front, back, upper right, lower left, etc.) relative to the electronic device 102. For instance, the user may say a first word toward the bottom of the electronic device 102, say a second word toward the top of the electronic device 102, say a third word toward the left of the electronic device 102 and say a fourth word toward the right of the electronic device 102.

The one or more additional authentication inputs may be utilized with or without timing and/or sequence constraints. In some examples, the one or more additional authentication inputs may be obtained by the electronic device 102 any time before, during or after the audio signal 106 is received. In other examples, the electronic device 102 may require (or be configured to require) that the one or more additional authentication inputs be received with a certain timing constraint and/or in a certain sequence relative to the reception of the audio signal 106. In one example, the electronic device 102 may require (or be configured to require) that the one or more additional authentication inputs be received within a period of time before, during and/or after the audio signal 106 is received. For instance, the electronic device 102 may require that an additional authentication input be received during a weaker speech component of the audio password. For example, assume that for an audio password "the oasis was a mirage," the "was a" portion may be less unique or weaker than another part of the audio password. The electronic device 102 may require (or be configured to require) that the additional authentication input (e.g., text, numeric code, alphanumeric string, spatial directionality and/or additional biometric (such as a fingerprint scan, camera image of a user's face or iris, etc.)) be received while the user utters "was a." Additionally or alternatively, the electronic device 102 may require (or be configured to require) that the additional authentication input be received in a particular sequence (e.g., before a speech component, after a speech component, between speech components, in a sequence with other additional authentication input(s), etc.).

In some configurations, the electronic device 102 (e.g., password evaluation module 108) may degrade the audio signal 106 and/or the additional authentication input. For example, the electronic device 102 may remove information from (e.g., downsample, filter out one or more portions of) the audio signal 106. Additionally or alternatively, the electronic device 102 may remove information from a fingerprint scan or from an image of a user's face or iris. One benefit of this approach is that users may not want to share exact or high-quality information (e.g., exact or high-quality biometric information such as a voice sample, a scanned fingerprint, image, etc.) for their security or privacy reasons. Accordingly, the degraded information may be simplified or degraded versions of the captured information. In some configurations, the degraded information of a single modality or input type (e.g., voice or speech, fingerprint, iris scan, etc.) by itself cannot be used for reliable user identification. However, the combination of degraded information from multiple modalities or input types may still provide strong authentication. Thus, even "iris" or "fingerprint" scanning may utilize an additional modality like a voice password even though non-degraded versions may offer high uniqueness strength themselves.

The password evaluation module 108 may provide evaluation information 110 to the password feedback module 112. The evaluation information 110 may include information that indicates password strength and/or information obtained in password evaluation. For example, the evaluation information 110 may include the extracted feature(s), the uniqueness measure, the password strength score and/or other information.

The password feedback module 112 may provide password feedback 114. For example, the password feedback module 112 may inform a user that the audio password is weak based on the evaluation of the strength of the audio password. Providing password feedback 114 may enable a user to determine (e.g., select, provide or create) an audio password that is sufficiently strong. The password feedback 114 may include the password strength score, one or more speech component candidates (e.g., recommended or suggested speech component(s)), one or more suggested actions and/or one or more messages. For example, the password feedback 114 may include the password strength score and a message indicating that the audio password is weak. Additionally or alternatively, the password feedback 114 may include one or more suggested speech components that the user may utilize to create a stronger audio password. In some configurations, the electronic device 102 may provide a suggested synthetic (e.g., unknown) word composed of suggested speech components as password feedback 114. Additionally or alternatively, the password feedback 114 may include a suggested action that the user may provide an additional authentication input (e.g., text, numeric code, alphanumeric string, spatial directionality, additional biometric (e.g., face scan, iris scan, fingerprint, etc.)).

In some configurations, the password feedback module 112 may provide one or more password suggestions. For example, the electronic device 102 (e.g., password feedback module 112) may identify one or more speech components (e.g., utterances, phonemes, etc.) with high enough uniqueness or distinction from one or more other models (e.g., generic speech model, universal model, UBM, etc.). For example, the password feedback module 112 may identify the one or more speech components based on the uniqueness of a user's voice for each phoneme via a pair of speech recognition and speaker verification systems. Then, the password feedback module 112 may generate some possible candidate speech component(s) (e.g., phonemes, syllables, utterances, passwords, etc.) that have high "uniqueness," such that a user may choose one or more candidate speech components to create a password. For example, the electronic device 102 may display password feedback 114 such as: "You can use /ah/, /k/, . . . , <triangular>, <qualcomm>, . . . ." Additionally or alternatively, detailed password feedback 114 may be provided for the password uttered by the user to strengthen it more (e.g., "Your password has 60% strength. The utterance /eh/ may be replaced by /ah/, . . . .").

In some configurations, the electronic device 102 (e.g., password feedback module 112) may provide a password suggestion with multi-modality. As described above, for example, the password feedback module 112 may provide password feedback 114 that suggests one or more additional authentication inputs (e.g., text, numeric code, alphanumeric string, spatial directionality, additional biometric (e.g., face scan, iris scan, fingerprint, etc.)).

In some configurations, the password feedback module 112 may perform one or more of the following operations to generate the password feedback 114. The password feedback module 112 may perform speech recognition based on the one or more extracted features. For example, the password feedback module 112 may determine one or more recognized speech components based on the one or more extracted features. Any known speech recognizer that provides a sequence of phonemes with time alignment based on the input may be utilized to determine one or more recognized speech components. One example of a speech recognizer that may be utilized is the Hidden Markov Model Toolkit (HTK).

The password feedback module 112 may align the uniqueness measure and the one or more recognized speech components. For example, the password feedback module 112 may align the occurrence of the one or more recognized speech components with the uniqueness measure in time. In some configurations, the time alignment for each speech component (e.g., phoneme) boundary is one of the by-products of speech recognition. In particular, the password feedback module 112 may utilize the boundary information for the recognized speech components (e.g., phonemes) and the uniqueness measure for corresponding time periods to produce aligned speech and uniqueness. For example, the password feedback module 112 may designate one or more points in time of the uniqueness measure as a speech component boundary as indicated by the speech component boundaries provided by the speech recognition.

The password feedback module 112 may classify the one or more speech components based on the uniqueness measure. For example, the password feedback module 112 may determine the uniqueness (e.g., strength or weakness) of each of the one or more speech components. In some configurations, the password feedback module 112 may compare the uniqueness measure (or some value based on the uniqueness measure, such as an average, maximum, minimum, etc., for example) at each of the aligned speech components to one or more thresholds. If the uniqueness measure corresponding to the speech component (or value based on the uniqueness measure) is greater than a threshold, then the corresponding speech component may be classified as unique enough or strong enough. In some configurations, speech component(s) that are classified as unique enough or strong enough (e.g., that are greater than the threshold) may be provided in the password feedback 114 as suggestions. Furthermore, similar speech component(s) and/or utterance(s), word(s), phrase(s) and/or password(s) that include the speech component or similar speech components may be provided in the password feedback 114 as suggestions.

The password feedback module 112 may provide password feedback 114 to the one or more output devices 116. The one or more output devices 116 may accordingly relay or convey the password feedback 114 to a user. For example, the output device(s) 116 (e.g., display, touchscreen, speaker, etc.) may relay a label associated with the strength of the audio password. In one approach, a display panel may display the password strength score. Additionally or alternatively, a speaker may output an acoustic signal (e.g., text-to-speech) that indicates the password strength score (e.g., "your password is weak," "your password is 60% strong," etc.).

In some configurations, the output device(s) 116 may relay one or more suggestions. For example, a display panel may display one or more suggested speech components, such as phonemes, syllables, words, utterances and/or phrases (e.g., "/ah/, /eh/, /k/, /triangular/, /mirage/"). Additionally or alternatively, a speaker may output an acoustic signal to relay the one or more suggestions (e.g., "please add /ah/, /eh/, /k/, /triangular/, /mirage/ and/or an additional input type to your password").

In some configurations, the password feedback 114 may be provided via one or more graphical user interfaces (GUIs). For example, the label (e.g., password strength score), one or more suggestions and/or one or more messages may be presented on the GUI. In some configurations, the GUI may also provide an interface for receiving user input. For example, a user may select one or more suggestions (e.g., one or more candidate speech components, a synthetic word, a suggested password, one or more additional authentication input options, etc.) via the GUI.

In some configurations, the electronic device 102 may include a verification module (not shown). The verification module may verify whether a user speaking is a true user or not based on the audio password. It should be noted that the verification procedure may be separate from the password evaluation procedure. For example, verification may not occur until a password (e.g., audio password and/or one or more additional authentication inputs) is set. Accordingly, password evaluation and suggestion as disclosed herein may include procedures that are separate from password verification, which may occur only after a password has been set, for example.

Figure 2:
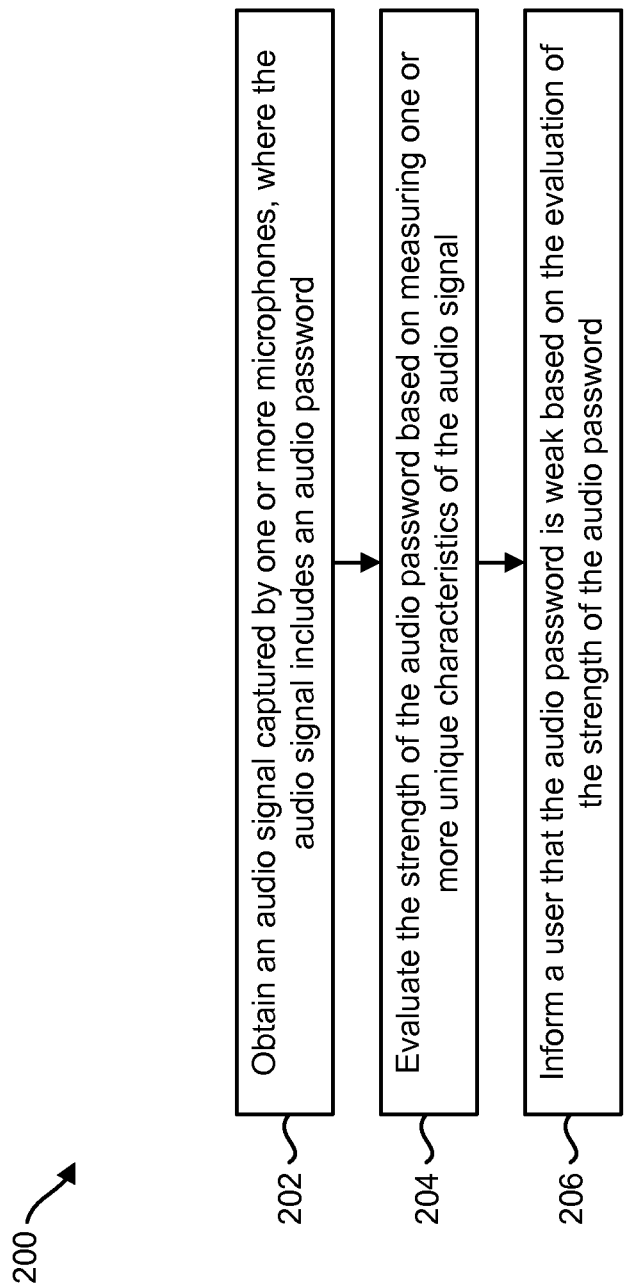
FIG. 2 is a flow diagram illustrating one configuration of a method for evaluating strength of an audio password.

FIG. 2 is a flow diagram illustrating one configuration of a method 200 for evaluating strength of an audio password. The electronic device 102 described in connection with FIG. 1 may perform the method 200.

The electronic device 102 may obtain 202 an audio signal 106 captured by the one or more microphones 104. This may be accomplished as described above in connection with FIG. 1. The audio signal 106 may include an audio password.

The electronic device 102 may evaluate 204 the strength of the audio password based on measuring one or more characteristics (e.g., unique characteristics) of the audio signal 106. This may be accomplished as described above in connection with FIG. 1. For example, the electronic device 102 may evaluate 204 the strength of one or more speech components (e.g., utterances, phonemes, etc.) of the audio password with a degree of uniqueness or distinction from one or more generic speech models (e.g., UBM). In some configurations, the password evaluation module 108 may utilize multiple generic speech models (e.g., UBMs) as described above. For example, the multiple generic speech models may be utilized (e.g., selected and/or adapted, etc.) based on a user's input and/or characteristics such as geographical location (e.g., zip code, city, county, state, country, etc.), gender, age, language, regional dialect, etc.

The electronic device 102 may evaluate 204 the strength of the audio password based on measuring one or more unique characteristics of the audio signal 106 as follows, in some configurations. The electronic device 102 may extract one or more features from the audio signal 106. The electronic device 102 may obtain a uniqueness measure of the audio signal 106 based on one or more generic speech models (e.g., UMBs). The electronic device 102 may determine a password strength score based on the uniqueness measure.

In some configurations, the electronic device 102 may determine whether the audio password is sufficiently strong (according to an arbitrary probability, according to user preference and/or enough to make it very unlikely for an imposter to pass as the true user by uttering the audio password, for example). For example, the password evaluation module 108 may compare the password strength score with a value. The value may be a previous password strength score and/or a threshold.

The electronic device 102 may provide password feedback 114. This may be accomplished as described above in connection with FIG. 1. For example, the electronic device 102 may inform 206 a user that the audio password is weak based on the evaluation of the strength of the audio password (when the password strength score is not greater than a value, for instance). The password feedback 114 may include the password strength score, one or more speech component candidates (e.g., recommended or suggested speech component(s)), one or more suggested actions and/or one or more messages. For example, the password feedback 114 may include the password strength score and a message indicating that the audio password is weak. Additionally or alternatively, the password feedback 114 may include one or more suggested speech components that the user may utilize to create a stronger audio password. Additionally or alternatively, the password feedback 114 may include a suggested action that the user may provide an additional authentication input (e.g., text, numeric code, alphanumeric string, spatial directionality, additional biometric (e.g., face scan, iris scan, fingerprint, etc.)).

The password feedback 114 may be provided to the one or more output devices 116. The one or more output devices 116 may accordingly relay or convey the password feedback 114 (e.g., a label, one or more suggested speech components, one or more suggested actions, etc.) to a user as described above in connection with FIG. 1.

The electronic device 102 may optionally verify a user input. For example, the electronic device 102 may receive a user input after the password (e.g., audio password and/or additional authentication inputs) has been set. The electronic device 102 may determine whether the user input matches the password sufficiently (e.g., with a high enough probability). One approach to audio password verification is provided in connection with FIG. 9. If the user input matches the password sufficiently (e.g., to a threshold probability and/or in accordance with one or additional criteria for the additional authentication input(s)), the electronic device 102 may grant access. For example, the electronic device 102 may allow a user access to one or more functions (e.g., applications, calling, etc.) if the user input matches the password sufficiently.

Figure 3:
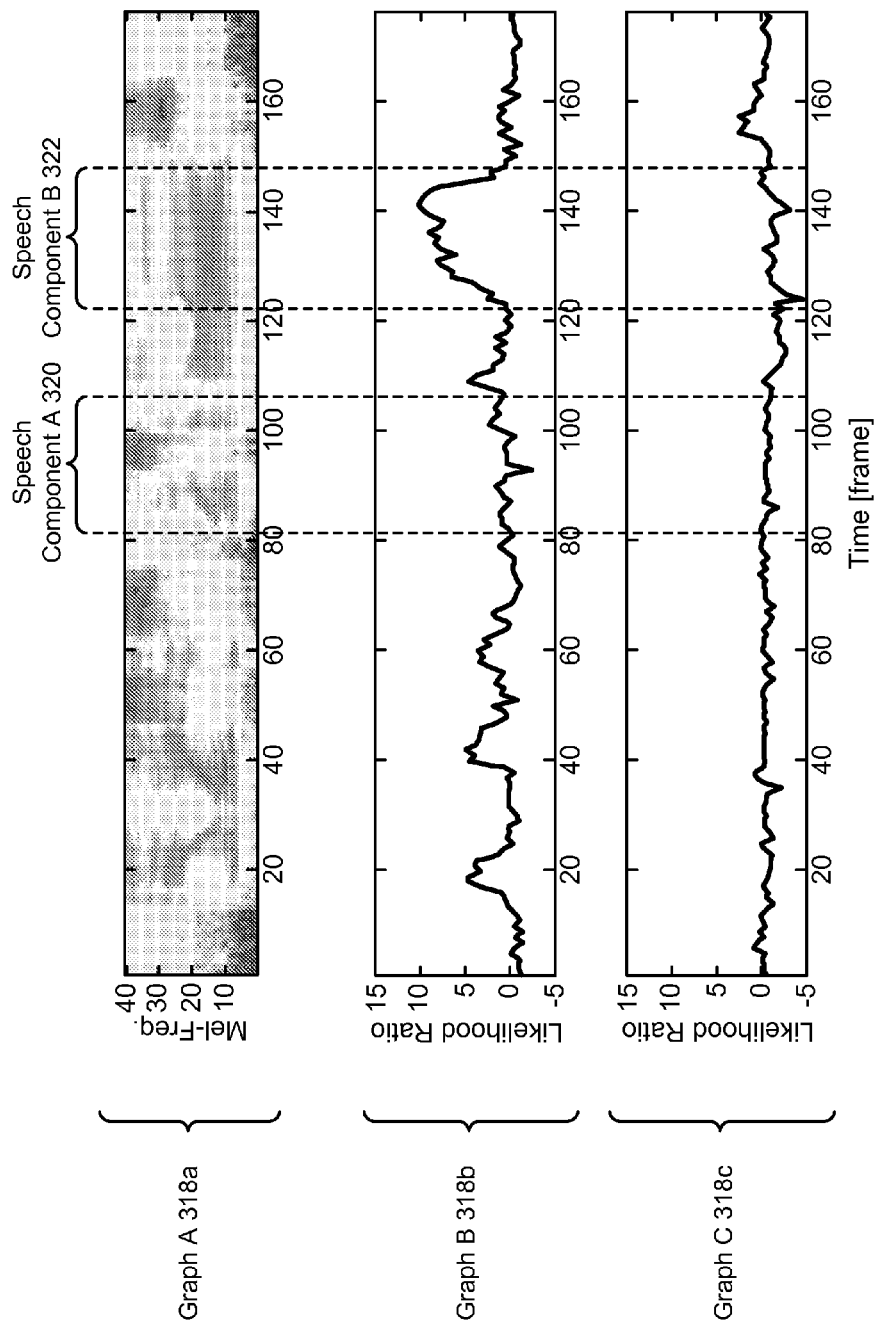
FIG. 3 includes graphs illustrating an example of a uniqueness measure.

FIG. 3 includes graphs illustrating an example of a uniqueness measure. In particular, FIG. 3 includes graph A 318a, graph B 318b and graph C 318c. The vertical axis of graph A 318a is illustrated in the mel-frequency scale and the horizontal axis of graph A 318a is illustrated in time (frames). The vertical axis of graph B 318b illustrates likelihood ratio and the horizontal axis of graph B 318b is illustrated in time (frames). The vertical axis of graph C 318c illustrates likelihood ratio and the horizontal axis of graph C 318c is illustrated in time (frames).

Graph A 318a illustrates a spectrogram in mel-frequency over time of an audio signal. The audio signal includes the phrase (e.g., the audio password) "the oasis was a mirage." Speech component A 320 includes the utterance "was a." Speech component B 322 includes the utterance "ah" in the word "mirage."

Graph B 318b illustrates one example of a uniqueness measure (e.g., likelihood ratio) for a true user (e.g., the true speaker or user to be authenticated) over time. The uniqueness measure corresponds to graph A 318a. In this example, the uniqueness measure is a likelihood ratio between a true user's speech (e.g., a user speech model) and a UBM. As can be observed in graph B 318b, speech component A 320 (e.g., "was a") has low uniqueness. However, speech component B 322 (e.g., the "ah" in "mirage") has high uniqueness for the true user.

Graph C 318c illustrates one example of a uniqueness measure (e.g., likelihood ratio) for an imposter over time. The uniqueness measure corresponds to graph A 318a. In this example, the uniqueness measure is a likelihood ratio between an imposter's speech (e.g., an imposter speech model) and the UBM. As can be observed in graph C 318c, speech component A 320 (e.g., "was a") and speech component B 322 have low uniqueness. As illustrated in FIG. 3, speech components (e.g., phonemes, syllables, words, etc.) that provide an elevated uniqueness (e.g., likelihood ratio) for the true user but that provide a low likelihood ratio for an imposter may be utilized to create stronger passwords.

Figure 4:
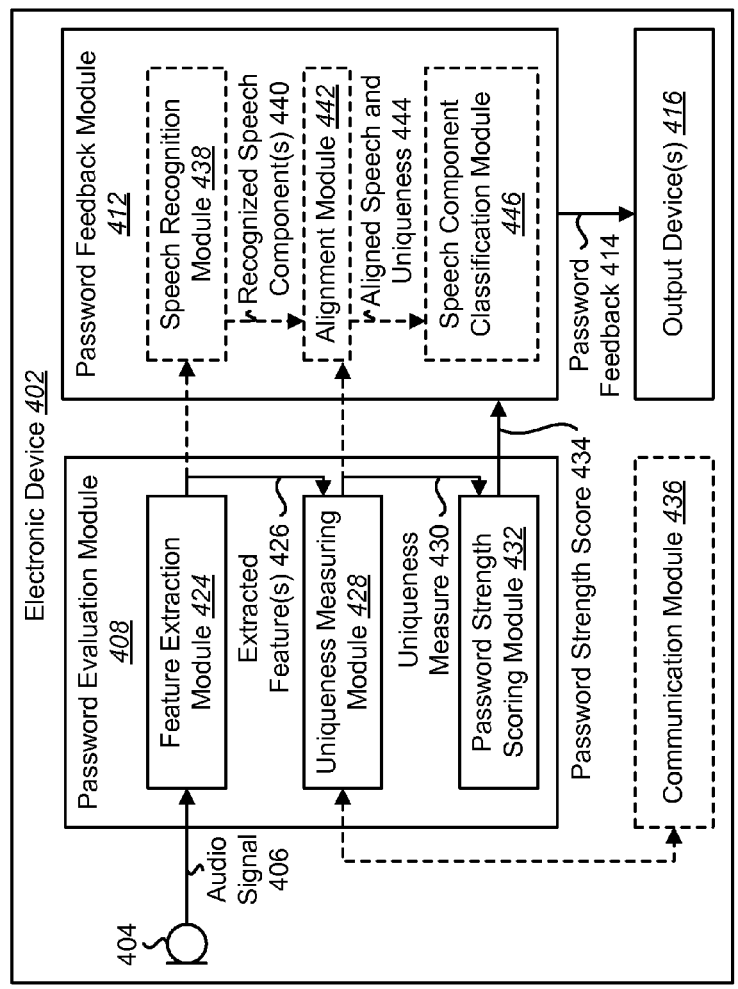
FIG. 4 is a block diagram illustrating a more specific configuration of an electronic device in which systems and methods for evaluating strength of an audio password may be implemented.

FIG. 4 is a block diagram illustrating a more specific configuration of an electronic device 402 in which systems and methods for evaluating strength of an audio password may be implemented. The electronic device 402 described in connection with FIG. 4 may be one example of the electronic device 102 described in connection with FIG. 1.

The electronic device 402 includes one or more microphones 404, a password evaluation module 408, a password feedback module 412 and one or more output devices 416. One or more of the components included in the electronic device 402 may correspond to and/or may function similarly to one or more of the components included in the electronic device 102 described in connection with FIG. 1.

The electronic device 402 may optionally include a communication module 436. The communication module 436 may enable the electronic device 402 to communicate with one or more remote devices (e.g., other electronic devices, base stations, servers, computers, network infrastructure, etc.). The communication module 436 may provide wireless and/or wired communications. For example, the communication module 436 may wirelessly communicate with one or more other devices in accordance with one or more wireless specifications (e.g., 3rd Generation Partnership Project (3GPP) specifications, Institute of Electrical and Electronics Engineers (IEEE) 802.11 specifications, etc.). Additionally or alternatively, the communication module 436 may communicate with other devices via a wired link (e.g., via Ethernet, wireline communication, etc.).

The one or more microphones 404 may capture an audio signal 406. The audio signal 406 may include an audio password. The audio password may include one or more sounds (e.g., one or more speech components such as phonemes, syllables, words, phrases, sentences, utterances, etc.) for verifying a user's identity. The audio signal 406 may be provided to the password evaluation module 408.

The password evaluation module 408 may include a feature extraction module 424, a uniqueness measuring module 428 and/or a password strength scoring module 432.

The password evaluation module 408 (e.g., feature extraction module 424) may obtain (e.g., receive) the audio signal 406 captured by the one or more microphones 404. The feature extraction module 424 may extract one or more features from the audio signal 406 to obtain extracted feature(s) 426. This may be accomplished as described above in connection with FIG. 1. For example, the feature extraction module 424 may determine one or more MFCCs based on the audio signal 406. The MFCCs may be one example of the extracted feature(s) 426. The feature extraction module 424 may be coupled to the uniqueness measuring module 428. The feature extraction module 424 may provide the extracted feature(s) 426 to the uniqueness measuring module 428.

The uniqueness measuring module 428 may obtain a uniqueness measure 430 of the audio signal 406 based on one or more generic speech models (e.g., UMBs). In some configurations, the uniqueness measure may be a likelihood ratio between the audio signal 406 and the generic speech model(s). Graph B 318b in FIG. 3 illustrates one example of the uniqueness measure 430 (e.g., likelihood ratio). In some configurations, the electronic device 402 may determine (e.g., compute) the uniqueness measure 430 locally. For example, the electronic device 402 may locally store one or more generic speech models, which may be utilized to determine the uniqueness measure 430. In other configurations, the electronic device 402 may receive the uniqueness measure 430 from a remote device (e.g., server, central server). For example, a remote device (e.g., server, central server) may store one or more generic speech models, which may be used to remotely determine the uniqueness measure 430.

In some configurations, the generic speech model may be obtained and/or updated as described above in connection with FIG. 1. For example, the electronic device 402 and/or a remote device (e.g., server) may obtain and/or update the generic speech model(s). In some configurations, the electronic device 402 may obtain and/or update the generic speech model(s). For example, the electronic device 402 (e.g., uniqueness measuring module 428) may store predetermined data for the generic speech model(s). The electronic device 402 may optionally update the generic speech model(s) by receiving data from a remote device (e.g., server, central server, etc.) via the communication module 436.

In some configurations, the electronic device 402 (e.g., uniqueness measuring module 428) may receive and/or determine user characteristics (e.g., gender, age, location, etc.). For example, the uniqueness measuring module 428 may obtain user characteristics as input by the user via one or more input devices. The electronic device 402 (e.g., uniqueness measuring module 428) may optionally send a generic speech model (e.g., UBM) update request to a remote device (e.g., server, central server, etc.). In some approaches, the generic speech model update request may include one or more indicators of the user characteristics. The remote device may optionally determine updates for the generic speech model(s) of the electronic device 402 (based on the user characteristic(s), for example). The remote device may send generic speech model (e.g., UBM) update data to the electronic device 402. The generic speech model update data may be based on the user characteristics, which may be utilized by the electronic device 402 to adapt or modify the generic speech model(s) used by the electronic device 402 (e.g., uniqueness measuring module 428).

In some configurations, the electronic device 402 may send a uniqueness measure request to a remote device. For example, the uniqueness measuring module 428 may provide the uniqueness measure request to the communication module 436, which may send the uniqueness measure request to the remote device (e.g., server). The uniqueness measure request may include information about the audio signal 106 (e.g., extracted feature(s) 426). In this approach, the remote device (e.g., server) may determine (e.g., compute) the uniqueness measure 430 (e.g., likelihood ratio) based on one or more generic speech models (e.g., UBMs). The electronic device 402 (e.g., communication module 436) may receive the uniqueness measure 430 and provide the uniqueness measure 430 to the uniqueness measuring module 428.

It should be noted that the remote device may obtain, maintain and/or adapt its generic speech model(s) based on user information (e.g., location, age, gender, etc.) in some configurations. The user information may be received by the remote device from the electronic device 402, one or more other devices and/or one or more third parties. The remote device may then send the uniqueness measure to the electronic device 402.

The uniqueness measuring module 428 may provide the uniqueness measure 430 to the password strength scoring module 432. The password strength scoring module 432 may determine one or more password strength scores 434 based on the uniqueness measure 430. This may be accomplished as described above in connection with FIG. 1. For example, the password strength score may be the uniqueness measure and/or determining the password strength score may include combining (e.g., summing, averaging, etc.) portions of the uniqueness measure. Additionally or alternatively, determining the password strength score may include mapping the uniqueness measure, mapping one or more portions of the uniqueness measure and/or mapping one or more summary statistics to a numeric value (e.g., a percentage), to a word (e.g., "weak," "moderate," "strong," etc.) and/or to some other indicator (e.g., a color, a shape, etc.).

The password strength scoring module 432 may determine whether the audio password is sufficiently strong as described above in connection with FIG. 1. For example, the password strength scoring module 432 may compare the password strength score(s) 434 with one or more values (e.g., a previous password strength score and/or a threshold). In some configurations, the password strength score may reflect one or more additional authentication inputs (e.g., spatial directionality, text, numeric code, alphanumeric string, additional biometric, etc.) in combination with the audio password. In some configurations, the electronic device 402 (e.g., password evaluation module 408) may degrade the audio signal 406 and/or the additional authentication input.

The password evaluation module 408 may provide evaluation information to the password feedback module 412. For example, the evaluation information 410 may include the extracted feature(s) 426, the uniqueness measure 430, the password strength score(s) 434 and/or other information.

The password feedback module 412 may optionally include a speech recognition module 438, an alignment module 442 and/or a speech component classification module 446. The speech recognition module 438 may perform speech recognition based on the one or more extracted features 426. For example, the password feedback module 412 may determine one or more recognized speech components 440 based on the one or more extracted features 426. This may be accomplished as described above in connection with FIG. 1. The speech recognition module 438 may provide the recognized speech component(s) 440 to the alignment module 442.

The alignment module 442 may align the uniqueness measure 430 and the one or more recognized speech components 440. For example, the alignment module 442 may align the occurrence of the one or more recognized speech components 440 with the uniqueness measure in time to produce aligned speech and uniqueness 444. This may be accomplished as described above in connection with FIG. 1. The alignment module 442 may provide the aligned speech and uniqueness 444 to the speech component classification module 446.

The speech component classification module 446 may classify the one or more speech components (e.g., recognized speech components 440) based on the uniqueness measure 430. For example, the password feedback module 412 may determine the uniqueness (e.g., strength or weakness) of each of the one or more recognized speech components in the aligned speech and uniqueness 444. In some configurations, the password feedback module 412 may compare the uniqueness measure (or some value based on the uniqueness measure, such as an average, maximum, minimum, etc., for example) at each of the aligned speech components to one or more thresholds. If the uniqueness measure corresponding to the speech component (or value based on the uniqueness measure) is greater than a threshold, then the corresponding speech component may be classified as unique enough or strong enough. In some configurations, speech component(s) that are classified as unique enough or strong enough (e.g., that are greater than the threshold) may be provided in the password feedback 414 as suggestions. Furthermore, similar speech component(s) and/or utterance(s), word(s), phrase(s) and/or password(s) that include the speech component or similar speech components may be provided in the password feedback 414 as suggestions.

The password feedback module 412 may provide password feedback 414 to the one or more output devices 416. The password feedback 414 may include the password strength score, one or more speech component candidates (e.g., recommended or suggested speech component(s)), one or more suggested actions (e.g., suggesting one or more additional authentication inputs) and/or one or more messages. The one or more output devices 416 may accordingly relay or convey the password feedback 414 to a user. This may be accomplished as described above in connection with FIG. 1. For example, the output device(s) 416 may output the password feedback 414 as text, an image and/or sound. The output may relay a label (e.g., the password strength score), one or more speech component candidates (e.g., recommended or suggested speech component(s)), one or more suggested actions (e.g., suggesting one or more additional authentication inputs) and/or one or more messages.

Figure 5:
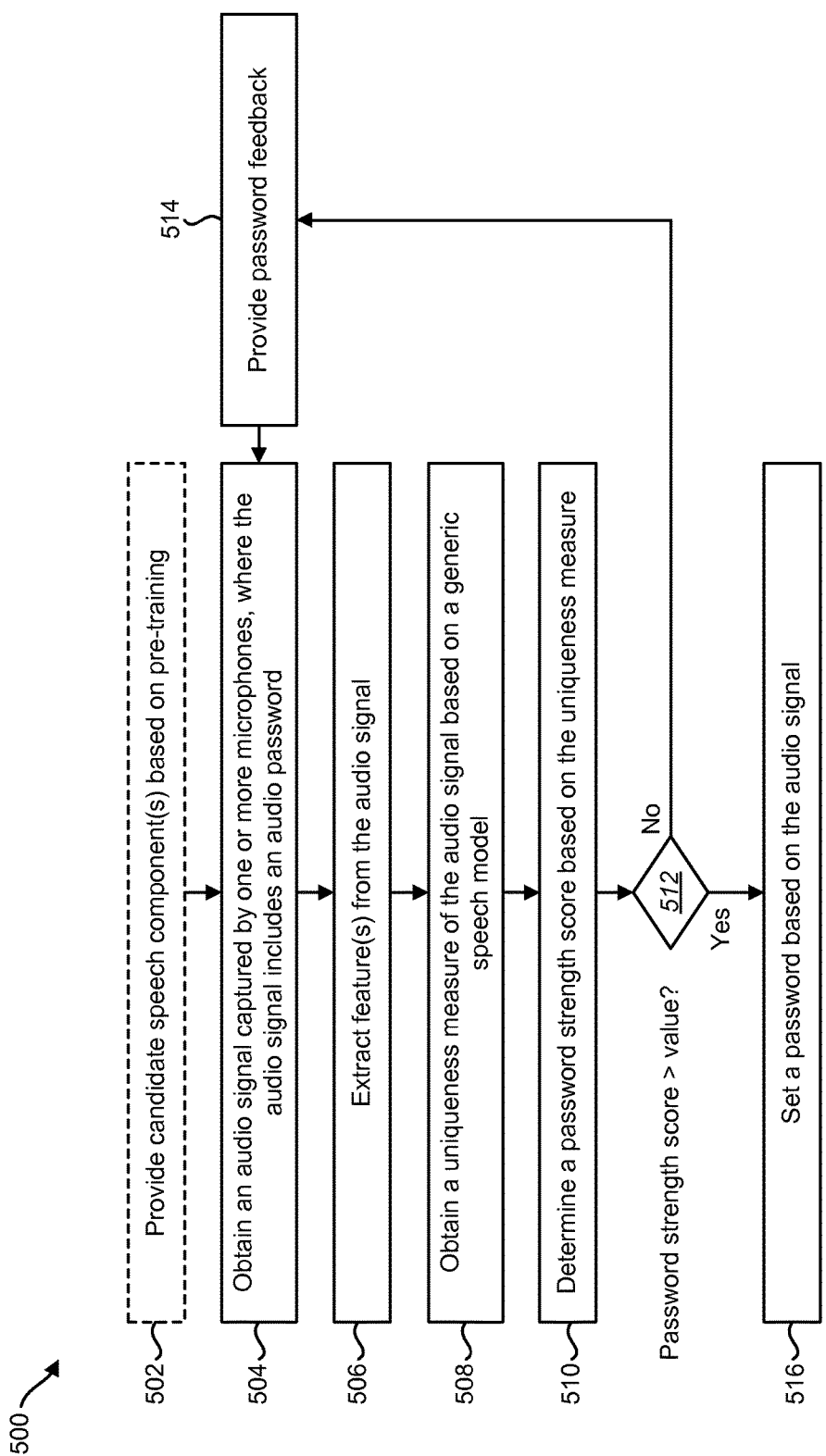
FIG. 5 is a flow diagram illustrating a more specific configuration of a method for evaluating strength of an audio password.

FIG. 5 is a flow diagram illustrating a more specific configuration of a method 500 for evaluating strength of an audio password. One or more of the electronic devices 102, 402 described in connection with FIGS. 1 and 4 may perform the method 500.

The electronic device 402 may optionally provide 502 one or more candidate speech components based on pre-training. An example of providing 502 one or more candidate speech components based on pre-training is described in connection with FIG. 10.

The electronic device 402 may obtain 504 an audio signal 406 captured by the one or more microphones 404. This may be accomplished as described above in connection with one or more of FIGS. 1-2 and 4. The audio signal 106 may include an audio password. The audio password may include one or more sounds (e.g., one or more speech components such as phonemes, syllables, words, phrases, sentences, utterances, etc.) for verifying a user's identity.

The electronic device 402 may extract 506 one or more features from the audio signal 406 to obtain extracted feature(s) 426. This may be accomplished as described above in connection with one or more of FIGS. 1 and 4. For example, the electronic device 402 may determine one or more MFCCs based on the audio signal 406. The MFCCs may be one example of the extracted feature(s) 426.

The electronic device 402 may obtain 508 a uniqueness measure 430 of the audio signal 406 based on one or more generic speech models (e.g., UMBs). This may be accomplished as described above in connection with one or more of FIGS. 1-4. In some configurations, the uniqueness measure may be a likelihood ratio between the audio signal 406 and the generic speech model(s). In some configurations, the electronic device 402 may determine (e.g., compute) the uniqueness measure 430 locally. For example, the electronic device 402 may locally store one or more generic speech models (e.g., local UBM(s)), which may be utilized to determine the uniqueness measure 430. In other configurations, the electronic device 402 may receive the uniqueness measure 430 from a remote device (e.g., server, central server). For example, a remote device (e.g., server, central server) may store one or more generic speech models, which may be used to remotely determine the uniqueness measure 430. In some configurations, the electronic device 402 may send a uniqueness measure request to the remote device. The uniqueness measure request may include information about the audio signal 406 (e.g., extracted feature(s) 426). In this approach, the remote device (e.g., server) may determine (e.g., compute) the uniqueness measure 430 (e.g., likelihood ratio) based on one or more generic speech models (e.g., UBMs). The electronic device 402 may receive the uniqueness measure 430.

The electronic device 402 may determine 510 a password strength score 434 based on the uniqueness measure 430. This may be accomplished as described above in connection with one or more of FIGS. 1 and 4.

The electronic device 402 may determine 512 whether the password strength score is greater than a value. This may be accomplished as described above in connection with one or more of FIGS. 1 and 4. For example, the electronic device 402 may compare the password strength score 434 with a value (e.g., a previous password strength score and/or a threshold).

If the password strength score 434 is greater than the value (e.g., a previous password strength score and/or a threshold), the electronic device 402 may set 516 a password based on the audio signal 406. In some configurations, the electronic device 402 may store the audio signal 406 and/or designate the audio signal 406 as the password. Additionally or alternatively, the electronic device 402 may store and/or designate a combination of recognized speech components included in the audio signal 406 as the password.

If the password strength score 434 is not greater than the value (e.g., is less than or equal to the value), the electronic device 402 may provide 514 password feedback. This may be accomplished as described above in connection with one or more of FIGS. 1-2 and 4. For example, the electronic device 402 may provide and/or output password feedback 414. The password feedback 414 may include the password strength score, one or more speech component candidates (e.g., recommended or suggested speech component(s)), one or more suggested actions (e.g., suggesting one or more additional authentication inputs) and/or one or more messages. For example, the electronic device 402 may output the password feedback 414 as text, an image and/or sound. The output may relay a label (e.g., the password strength score), one or more speech component candidates (e.g., recommended or suggested speech component(s)), one or more suggested actions (e.g., suggesting one or more additional authentication inputs) and/or one or more messages.

Figure 6:
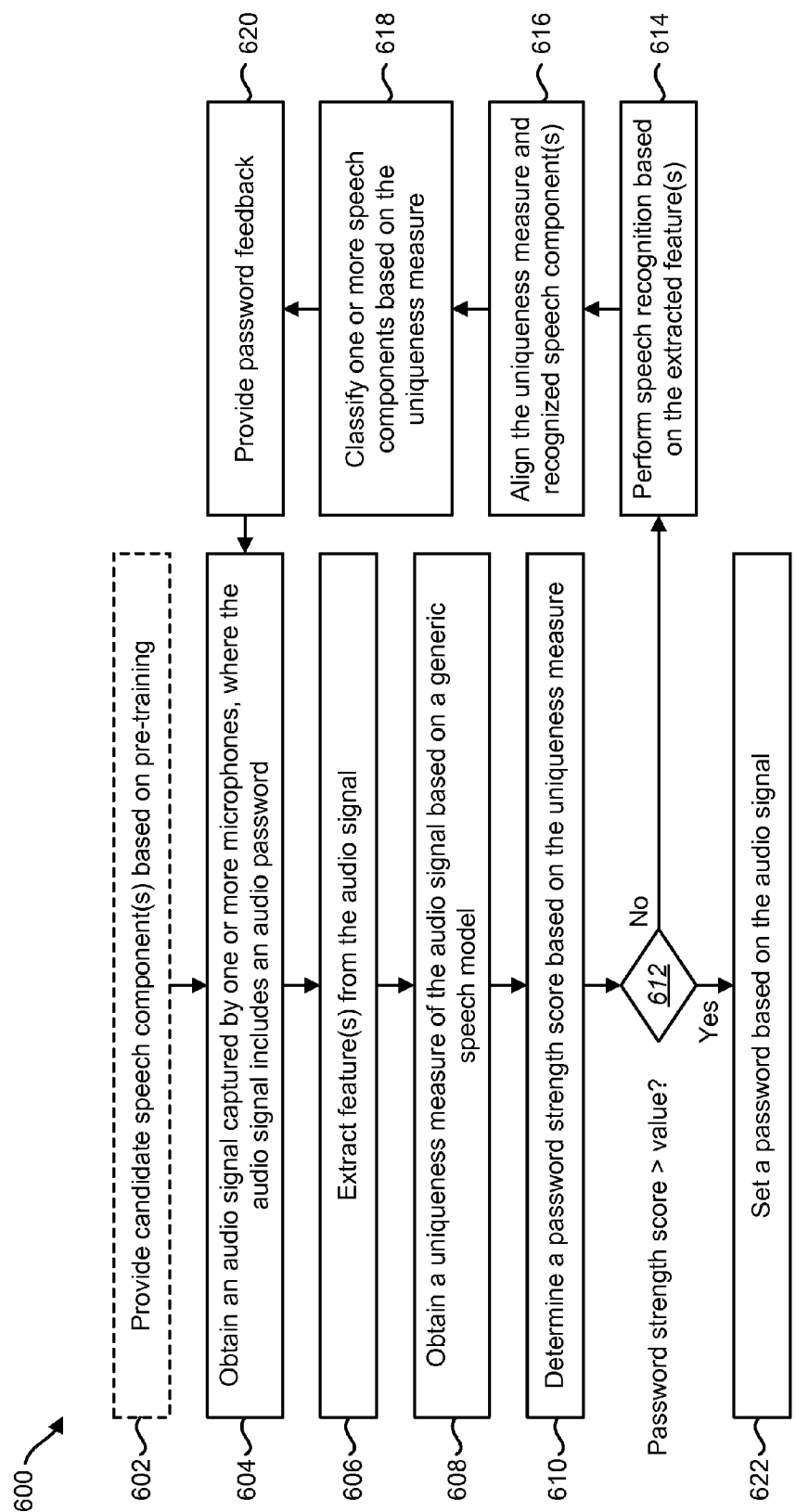
FIG. 6 is a flow diagram illustrating another more specific configuration of a method for evaluating strength of an audio password.

FIG. 6 is a flow diagram illustrating another more specific configuration of a method 600 for evaluating strength of an audio password. In particular, this configuration provides an example of operations that may be performed in order to provide one or more suggestions. One or more of the electronic devices 102, 402 described in connection with FIGS. 1 and 4 may perform the method 600.

The electronic device 402 may optionally provide 602 one or more candidate speech components based on pre-training. An example of providing 602 one or more candidate speech components based on pre-training is described in connection with FIG. 10.

The electronic device 402 may obtain 604 an audio signal 406 captured by the one or more microphones 404. This may be accomplished as described above in connection with one or more of FIGS. 1-2 and 4-5.

The electronic device 402 may extract 606 one or more features from the audio signal 406 to obtain extracted feature(s) 426. This may be accomplished as described above in connection with one or more of FIGS. 1 and 4-5.

The electronic device 402 may obtain 608 a uniqueness measure 430 of the audio signal 406 based on one or more generic speech models (e.g., UMBs). This may be accomplished as described above in connection with one or more of FIGS. 1 and 4-5.

The electronic device 402 may determine 610 a password strength score 434 based on the uniqueness measure 430. This may be accomplished as described above in connection with one or more of FIGS. 1 and 4-5.

The electronic device 402 may determine 612 whether the password strength score is greater than a value. This may be accomplished as described above in connection with one or more of FIGS. 1 and 4-5.

If the password strength score 434 is greater than the value (e.g., a previous password strength score and/or a threshold), the electronic device 402 may set 622 a password based on the audio signal 406. This may be accomplished as described above in connection with FIG. 5.

If the password strength score 434 is not greater than the value (e.g., is less than or equal to the value), the electronic device 402 may perform 614 speech recognition based on the one or more extracted features 426. For example, the electronic device 402 may determine one or more recognized speech components 440 based on the one or more extracted features 426. This may be accomplished as described above in connection with FIG. 1.

The electronic device 402 may align 616 the uniqueness measure 430 and the one or more recognized speech components 440. For example, the electronic device 402 may align the occurrence of the one or more recognized speech components with the uniqueness measure in time to produce aligned speech and uniqueness 444. This may be accomplished as described above in connection with one or more of FIGS. 1 and 4.

The electronic device 402 may classify 618 the one or more speech components (e.g., recognized speech components 440) based on the uniqueness measure 430. For example, the electronic device 402 may determine the uniqueness (e.g., strength or weakness) of each of the one or more recognized speech components in the aligned speech and uniqueness 444. In some configurations, the password feedback module 412 may compare the uniqueness measure (or some value based on the uniqueness measure, such as an average, maximum, minimum, etc., for example) at each of the aligned speech components to one or more thresholds. If the uniqueness measure corresponding to the speech component (or value based on the uniqueness measure) is greater than a threshold, then the corresponding speech component may be classified as unique enough or strong enough. In some configurations, speech component(s) that are classified as unique enough or strong enough (e.g., that are greater than the threshold) may be provided 620 in the password feedback 414 as suggestions. Furthermore, similar speech component(s) and/or utterance(s), word(s), phrase(s) and/or password(s) that include the speech component or similar speech components may be provided 620 in the password feedback 414 as suggestions.

The electronic device 402 may provide 620 password feedback. This may be accomplished as described above in connection with one or more of FIGS. 1 and 4-5. For example, the electronic device 402 may provide and/or output password feedback 414. The password feedback 414 may include the password strength score, one or more speech component candidates (e.g., recommended or suggested speech component(s)), one or more suggested actions (e.g., suggesting one or more additional authentication inputs) and/or one or more messages. For example, the electronic device 402 may output the password feedback 414 as text, an image and/or sound. The output may relay a label (e.g., the password strength score), one or more speech component candidates (e.g., recommended or suggested speech component(s)), one or more suggested actions (e.g., suggesting one or more additional authentication inputs) and/or one or more messages. In some configurations, the electronic device 402 may provide 620 a suggested synthetic (e.g., unknown) word composed of suggested speech components as password feedback.

Figure 7:
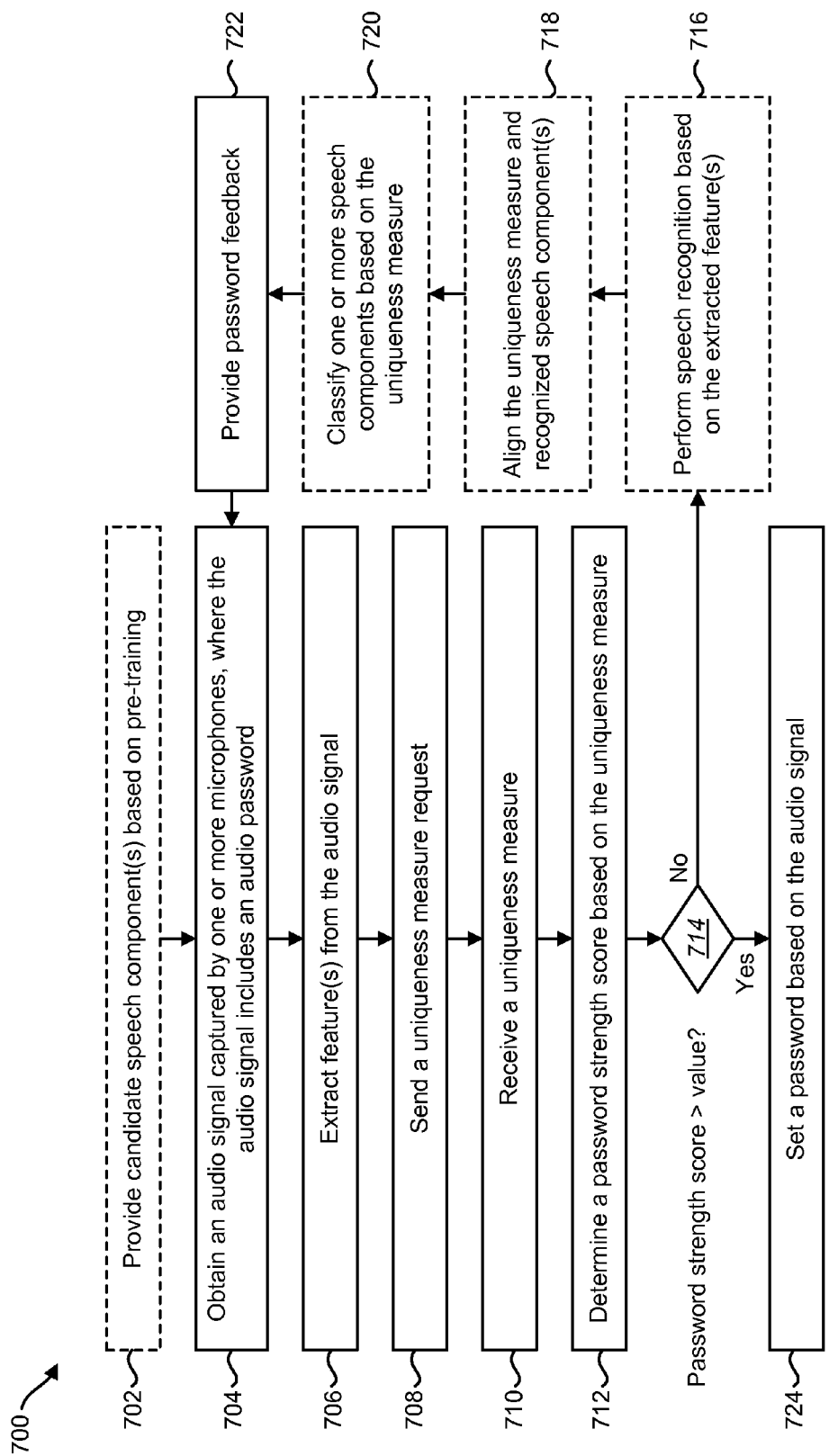
FIG. 7 is a flow diagram illustrating another more specific configuration of a method for evaluating strength of an audio password.

FIG. 7 is a flow diagram illustrating another more specific configuration of a method 700 for evaluating strength of an audio password. In particular, this configuration provides an example of operations that may be performed for password strength evaluation and suggestion with other users' models. One or more of the electronic devices 102, 402 described in connection with FIGS. 1 and 4 may perform the method 700.

The electronic device 402 may optionally provide 702 one or more candidate speech components based on pre-training. An example of providing 702 one or more candidate speech components based on pre-training is described in connection with FIG. 10.

The electronic device 402 may obtain 704 an audio signal 406 captured by the one or more microphones 404. This may be accomplished as described above in connection with one or more of FIGS. 1-2 and 4-6.

The electronic device 402 may extract 706 one or more features from the audio signal 406 to obtain extracted feature(s) 426. This may be accomplished as described above in connection with one or more of FIGS. 1 and 4-6.

The electronic device 402 may send 708 a uniqueness measure request (to a remote device, for example). This may be accomplished as described above in connection with FIG. 4. For example, the electronic device 402 may send the uniqueness measure request to the remote device (e.g., server) via wired and/or wireless communications. The uniqueness measure request may include information about the audio signal 406 (e.g., extracted feature(s) 426). In this approach, the remote device (e.g., server) may determine (e.g., compute) the uniqueness measure 430 (e.g., likelihood ratio) based on one or more generic speech models (e.g., UBMs, other users' speech models, etc.). It should be noted that the remote device may obtain, maintain and/or adapt its generic speech model(s) based on user information (e.g., location, age, gender, etc.) in some configurations. The user information may be received by the remote device from the electronic device 402, one or more other devices and/or one or more third parties. The remote device may then send the uniqueness measure to the electronic device 402.

The electronic device 402 (e.g., communication module 436) may receive 710 the uniqueness measure 430. For example, the electronic device 402 may receive 710 the uniqueness measure 430 from a remote device (e.g., server) via wired and/or wireless communications.

The electronic device 402 may determine 712 a password strength score 434 based on the uniqueness measure 430. This may be accomplished as described above in connection with one or more of FIGS. 1 and 4-6.

The electronic device 402 may determine 714 whether the password strength score is greater than a value. This may be accomplished as described above in connection with one or more of FIGS. 1 and 4-6.

If the password strength score 434 is greater than the value (e.g., a previous password strength score and/or a threshold), the electronic device 402 may set 724 a password based on the audio signal 406. This may be accomplished as described above in connection with one or more of FIGS. 5-6.

If the password strength score 434 is not greater than the value (e.g., is less than or equal to the value), the electronic device 402 may optionally perform 716 speech recognition based on the one or more extracted features 426. This may be accomplished as described above in connection with one or more of FIGS. 1 and 6.

The electronic device 402 may optionally align 718 the uniqueness measure 430 and the one or more recognized speech components 440. This may be accomplished as described above in connection with one or more of FIGS. 1, 4 and 6.

The electronic device 402 may optionally classify 720 the one or more speech components (e.g., recognized speech components 440) based on the uniqueness measure 430. This may be accomplished as described above in connection with one or more of FIGS. 1, 4 and 6.

The electronic device 402 may provide 722 password feedback. This may be accomplished as described above in connection with one or more of FIGS. 1 and 4-6.

Figure 8:
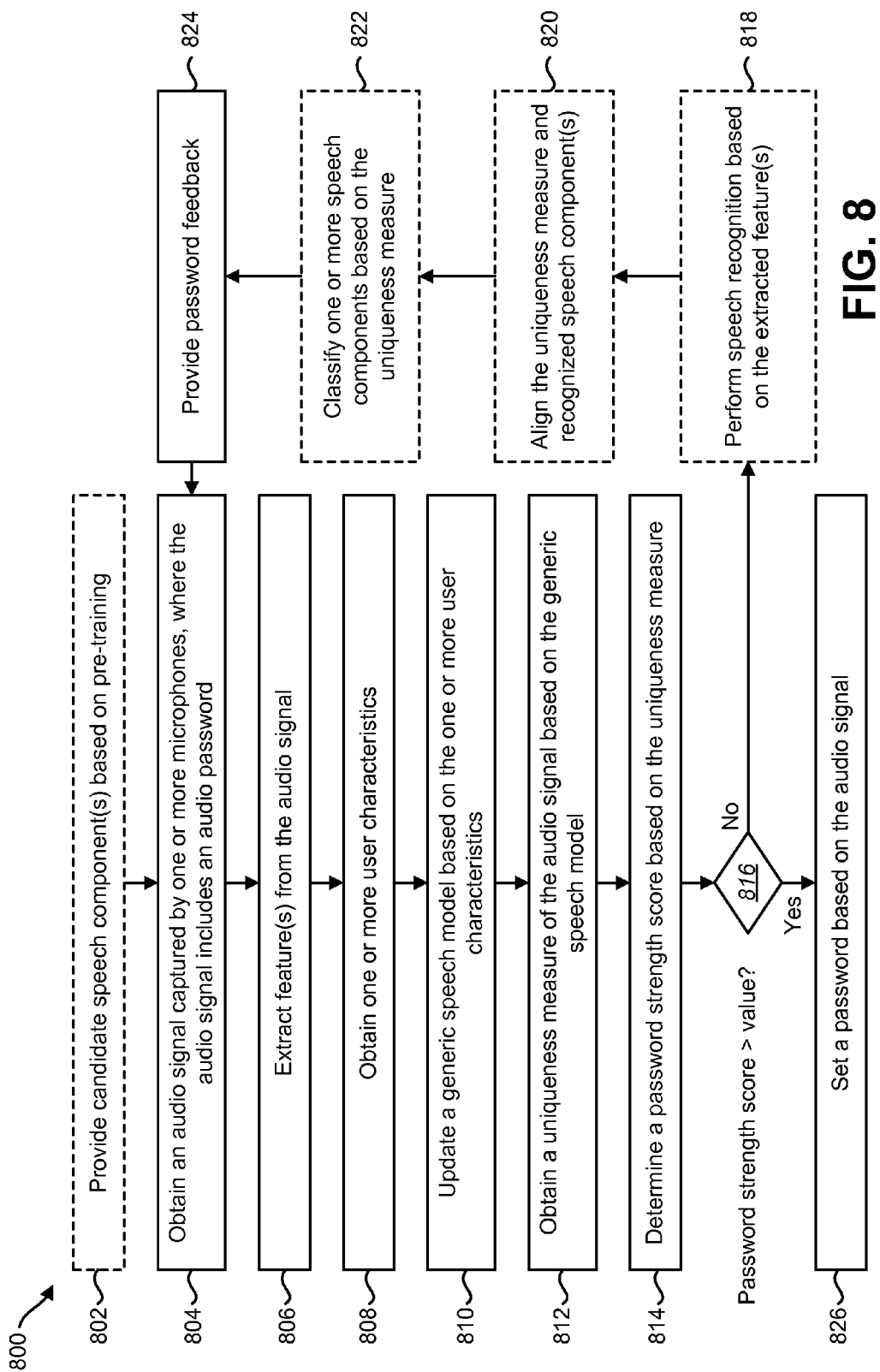
FIG. 8 is a flow diagram illustrating another more specific configuration of a method for evaluating strength of an audio password.

FIG. 8 is a flow diagram illustrating another more specific configuration of a method 800 for evaluating strength of an audio password. In particular, this configuration provides an example of operations that may be performed for updating a generic speech model. One or more of the electronic devices 102, 402 described in connection with FIGS. 1 and 4 may perform the method 800.

The electronic device 402 may optionally provide 802 one or more candidate speech components based on pre-training. An example of providing 802 one or more candidate speech components based on pre-training is described in connection with FIG. 10.

The electronic device 402 may obtain 804 an audio signal 406 captured by the one or more microphones 404. This may be accomplished as described above in connection with one or more of FIGS. 1-2 and 4-7.

The electronic device 402 may extract 806 one or more features from the audio signal 406 to obtain extracted feature(s) 426. This may be accomplished as described above in connection with one or more of FIGS. 1 and 4-7.

The electronic device 402 may obtain 808 one or more user characteristics. Examples of user characteristics include geographical location (e.g., zip code, city, county, state, country, etc.), gender, age, language and/or regional dialect, etc. For example, the electronic device 402 may receive one or more inputs (from a user, for instance) that indicate the one or more user characteristics. Additionally or alternatively, the electronic device 402 may obtain 808 the one or more user characteristics from one or more sensors. For example, the electronic device 402 may determine a user's gender, language and/or regional dialect based on audio captured from the microphone(s) 404. Additionally or alternatively, the electronic device 402 may estimate a user age based on audio captured from the microphone(s) 404. Additionally or alternatively, the electronic device 402 may determine a geographical location based on data from a Global Positioning System (GPS) module. Additionally or alternatively, the electronic device 402 may request the one or more user characteristics from a remote device (e.g., service provider server).

The electronic device 402 may update 810 a generic speech model based on the one or more user characteristics. This may be accomplished as described above in connection with one or more of FIGS. 1 and 4. For example, the electronic device 402 and/or a remote device (e.g., server) may update 810 the generic speech model(s). In some configurations, the electronic device 402 may locally update 810 the generic speech model(s) based on the user characteristics. For example, the electronic device 402 may optionally store predetermined data for the generic speech model(s), which the electronic device 402 may update 810 locally by only including data of other users with characteristics similar to the user's characteristics.

The electronic device 402 may optionally update 810 the generic speech model(s) based on the user characteristic(s) by sending the user characteristics to a remote device (e.g., server) and/or receiving data from the remote device (e.g., server, central server, etc.) via the communication module 436. For example, the electronic device 402 may send a generic speech model (e.g., UBM) update request to a remote device (e.g., server, central server, etc.). In some approaches, the generic speech model update request may include one or more indicators of the user characteristics. In some configurations, the remote device may update one or more generic speech model(s) stored on the remote device based on the user characteristic(s). Additionally or alternatively, the remote device may optionally determine updates for the generic speech model(s) of the electronic device 402 (based on the user characteristic(s), for example). The remote device may send generic speech model (e.g., UBM) update data to the electronic device 402.

The electronic device 402 may obtain 812 a uniqueness measure 430 of the audio signal 406 based on one or more generic speech models (e.g., UMBs). This may be accomplished as described above in connection with one or more of FIGS. 1 and 4-7.

The electronic device 402 may determine 814 a password strength score 434 based on the uniqueness measure 430. This may be accomplished as described above in connection with one or more of FIGS. 1 and 4-7.

The electronic device 402 may determine 816 whether the password strength score is greater than a value. This may be accomplished as described above in connection with one or more of FIGS. 1 and 4-7.

If the password strength score 434 is greater than the value (e.g., a previous password strength score and/or a threshold), the electronic device 402 may set 826 a password based on the audio signal 406. This may be accomplished as described above in connection with one or more of FIGS. 5-7.

If the password strength score 434 is not greater than the value (e.g., is less than or equal to the value), the electronic device 402 may optionally perform 818 speech recognition based on the one or more extracted features 426. This may be accomplished as described above in connection with one or more of FIGS. 1 and 6-7.

The electronic device 402 may optionally align 820 the uniqueness measure 430 and the one or more recognized speech components 440. This may be accomplished as described above in connection with one or more of FIGS. 1,4 and 6-7.

The electronic device 402 may optionally classify 822 the one or more speech components (e.g., recognized speech components 440) based on the uniqueness measure 430. This may be accomplished as described above in connection with one or more of FIGS. 1,4 and 6-7.

The electronic device 402 may provide 824 password feedback. This may be accomplished as described above in connection with one or more of FIGS. 1 and 4-7.

Figure 9:
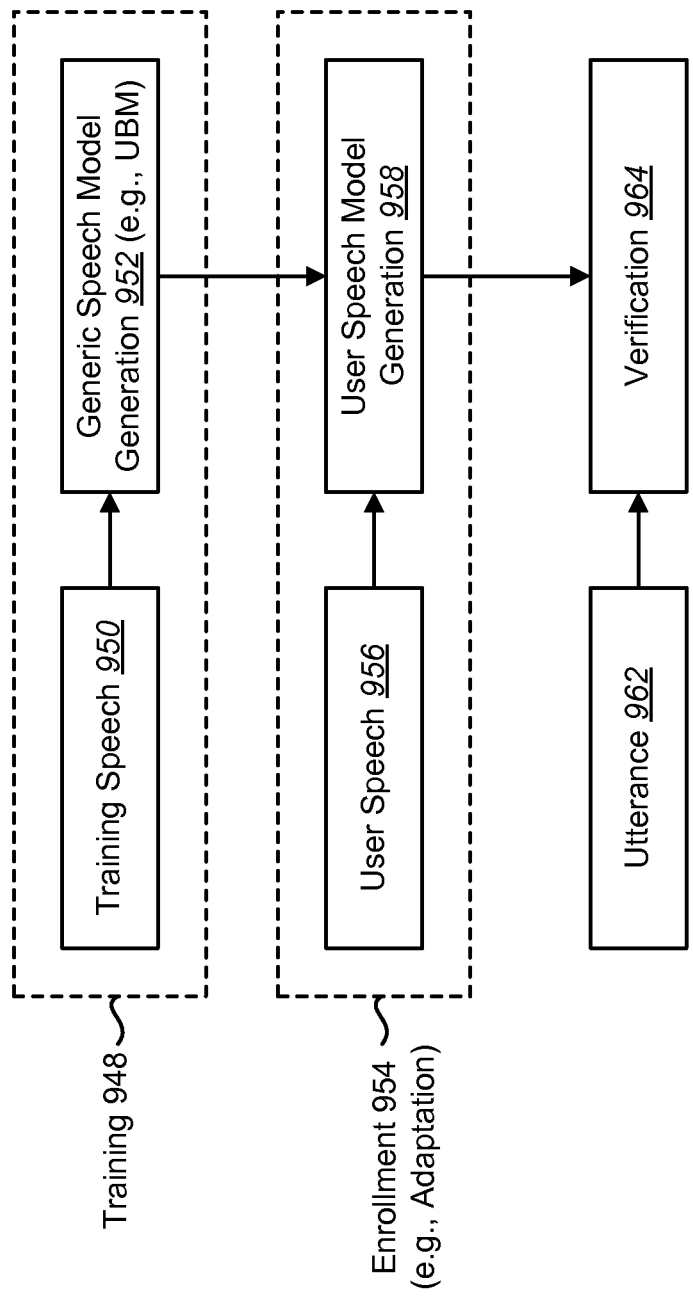
FIG. 9 is a block diagram illustrating one example of speaker (e.g., user) recognition models.

FIG. 9 is a block diagram illustrating one example of speaker (e.g., user) recognition models. Speaker recognition models may be based on text-independent speaker recognition. One model is based on MFCC and UBM-GMM. This includes training a UBM using a GMM. As illustrated in FIG. 9, training 948 may include utilizing training speech 950 for generic speech model generation 952.

In some approaches, speaker enrollment 954 may be performed using maximum a posteriori (MAP) adaptation to a generic speech model (e.g., UBM). As illustrated in FIG. 9, enrollment 954 (e.g., adaptation) may include utilizing user speech 956 for user speech model generation 958.

In some approaches, each speech utterance 962 may be verified by comparing a likelihood ratio between the generic speech model (e.g., UBM) and each enrolled speaker model. As illustrated in FIG. 9, each utterance 962 may be utilized in a verification 964 procedure. For example, the verification 964 procedure may be performed in accordance with Equation (1) and/or Equation (2). For instance, the verification 964 procedure may be performed in accordance with $$\sum_t \log(p(X \mid \lambda_{target})) - \log(p(X \mid \lambda_{generic})) > \theta,$$

where t is time, X is the utterance 962 or audio signal, $\lambda_{target}$ is the target (e.g., true user speech) model, $\lambda_{generic}$ is the generic speech model(s) (e.g., UBM(s)), $p(X|\lambda_{target})$ is the probability that X corresponds to the true user, $p(X|\lambda_{generic})$ is the probability that X corresponds to a generic user (e.g., imposter, non-true user, non-user-dependent model or generic speaker model) and θ is a verification threshold. When multiple speakers are identified, the one that produces the highest likelihood may be selected. Additionally or alternatively, other classifiers (e.g., support vector machine or neural networks) may be utilized.

Figure 10:
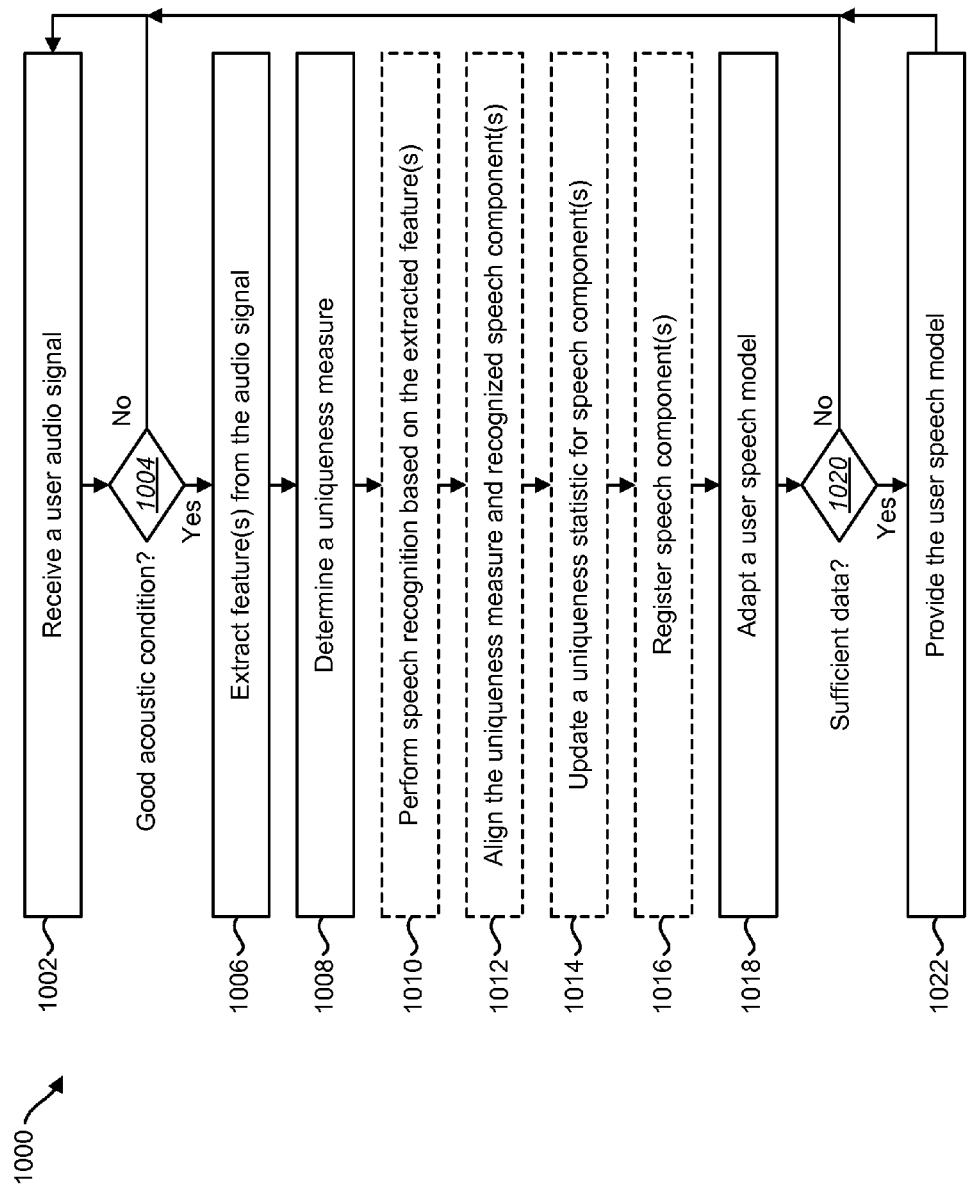
FIG. 10 is a flow diagram illustrating one configuration of a method for providing one or more candidate speech components based on pre-training.

FIG. 10 is a flow diagram illustrating one configuration of a method 1000 for providing one or more candidate speech components based on pre-training. For example, one or more of the procedures described in connection with FIG. 10 may be utilized in pre-training for enrollment. For example, pre-training for enrollment may occur before receiving an audio password for evaluation (in one or more of steps 502, 602, 702 and 802 described in connection with one or more of FIGS. 5-8, for instance).

More detail on enrollment and comparison is given hereafter. One approach to enrolling a user may include letting the user speak for a while to provide enough phonemes to adapt the user's model from the generic speech model (e.g., UBM). In some configurations, the electronic device(s) 102, 402 may provide some predefined phonetically balanced sentences to minimize the training time. Additionally or alternatively, the user may read a script that is long enough (to adequately train adapt the generic speech model to the user's speech model, for example).

Additionally or alternatively, the electronic device(s) 102, 402 may collect a user's data (e.g., speech) during a call, assuming that the user is the owner (e.g., true user) of the device. Once a certain level in terms of data size is reached, the electronic device(s) 102, 402 may notify or inform (e.g., display a message, output speech that provides the message) the user that the voice password may be enabled. In some configurations, the electronic device(s) may continue updating the user's speech model. In this way, a timbre change (e.g., age-dependent change) of the user over time may be monitored.

One or more of the electronic devices 102, 402 described in connection with one or more of FIGS. 1 and 4 may perform the method 1000. It should be noted that although one or more of the procedures performed during pre-training or enrollment as described in connection with FIG. 10 may be similar to one or more of procedures performed upon obtaining and evaluating an audio password (e.g., as described in connection with one or more of FIGS. 1-2 and 4-8), one or more of the procedures described in connection with FIG. 10 may be carried out separately from and/or before procedures carried out upon obtaining an audio password as described above.

The electronic device 402 may receive 1002 a user audio signal 406. For example, the user audio signal 406 may be captured by the one or more microphones 404. The user audio signal 406 may be received while the user reads a script or makes a phone call, for example.

The electronic device 402 may determine 1004 whether the user audio signal 406 is received in a good acoustic condition. For example, the electronic device 402 may determine a signal-to-noise ratio (SNR) of the user audio signal 406. If the SNR is above an SNR threshold, the electronic device 402 may determine 1004 that the user audio signal 406 is received in a good acoustic condition. If the SNR is not above (e.g., is less than or equal to) an SNR threshold, the electronic device 402 may determine 1004 that the user audio signal 406 is not received in a good acoustic condition. If the user audio signal 406 is not received in a good acoustic condition, the electronic device 402 may discard the received user audio signal 406 and return to receiving 1002 a subsequent user audio signal 406.

If the user audio signal 406 is received in a good acoustic condition, the electronic device 402 may extract 1006 one or more features from the audio signal 406 to obtain extracted feature(s) 426. For example, the electronic device 402 may determine one or more MFCCs based on the audio signal 406.

The electronic device 402 may determine 1008 a uniqueness measure 430 of the audio signal 406 based on one or more generic speech models (e.g., UMBs). In some configurations, the uniqueness measure may be a likelihood ratio between the audio signal 406 and the generic speech model(s). In some configurations, the electronic device 402 may determine (e.g., compute) the uniqueness measure 430 locally. In other configurations, the electronic device 402 may request and receive a uniqueness measure 430 from a remote device (e.g., server).

The electronic device 402 may perform 1010 speech recognition based on the one or more extracted features 426. For example, the electronic device 402 may determine one or more recognized speech components 440 based on the one or more extracted features 426.

The electronic device 402 may align 1012 the uniqueness measure 430 and the one or more recognized speech components 440. For example, the electronic device 402 may align the occurrence of the one or more recognized speech components with the uniqueness measure in time to produce aligned speech and uniqueness 444.

The electronic device 402 may update 1014 a uniqueness statistic for one or more speech components (e.g., recognized speech components). For example, the electronic device 402 may update 1014 a uniqueness statistic for a speech component based on the uniqueness measure that corresponds to that speech component. In some configurations, the electronic device 402 may store the uniqueness measure (or a value based on the uniqueness measure such as a maximum, minimum or average, for example) corresponding to one or more recognized speech components when they are captured and recognized. Each subsequent instance thereafter when a recognized speech component is obtained, the electronic device 402 may update the uniqueness statistic. For example, the electronic device 402 may compute some statistical measure (e.g., average, etc.) based on the stored uniqueness measure (or value) and the current uniqueness measure (or value). The electronic device 402 may then store the updated statistical measure.

The electronic device 402 may register 1016 one or more speech components. For example, the electronic device 402 may store data for each of the one or more recognized speech components. Additionally or alternatively, the electronic device 402 may designate one or more of the recognized speech components as unique or strong enough for password recommendation (if the speech component has a corresponding uniqueness measure or uniqueness statistic that is greater than a threshold, for example). For example, the electronic device 402 may provide one or more suggested speech components before initially receiving an audio password for password evaluation in some configurations.

The electronic device 402 may adapt 1018 a user speech model. For example, the electronic device 402 may adapt or modify the user speech model (that may be initially based on a generic speech model, for instance) by updating phoneme data and/or weights of the user speech model. In some configurations, adapting 1018 the user speech model may include updating one or more model parameters (e.g., GMM components). Specifically, adaptation 1018 may be performed by updating a mean and/or mixing weights of a GMM.

The electronic device 402 may determine 1020 whether there is sufficient data for the user speech model to accurately describe a user's speech. For example, the electronic device 402 may determine whether a threshold number and/or certain phonemes have been captured such that the user speech model is refined enough to accurately reflect the true user's speech. If there is not sufficient data, the electronic device 402 may continue receiving 1002 the user audio signal.

If there is sufficient data, the electronic device 402 may provide 1022 the user speech model. For example, the electronic device 402 may make the user speech model available for audio password strength evaluation and/or suggestion as described above. It should be noted that although the user speech model may be provided 1022 for use, the method 1000 may be repeated a number of times and/or continually in order to further adapt and/or refine the user speech model.

Figure 11:
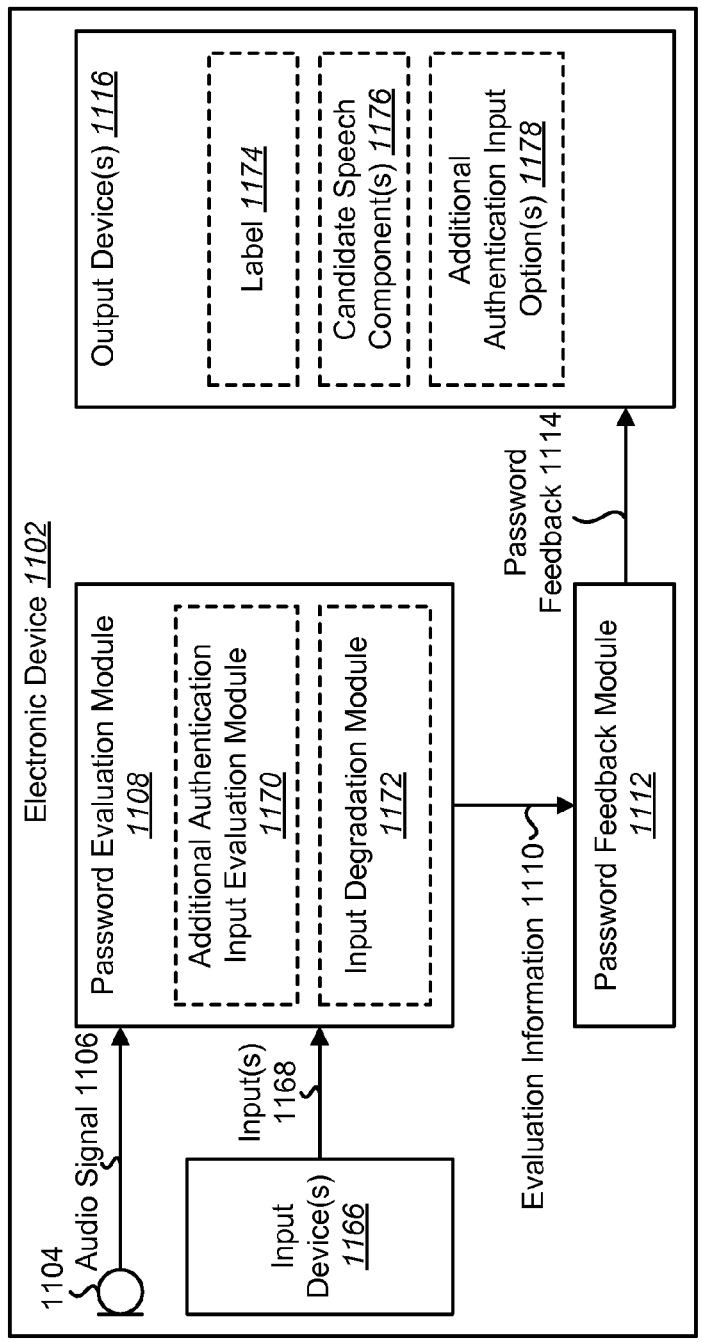
FIG. 11 is a block diagram illustrating another more specific configuration of an electronic device in which systems and methods for evaluating strength of an audio password may be implemented.

FIG. 11 is a block diagram illustrating another more specific configuration of an electronic device 1102 in which systems and methods for evaluating strength of an audio password may be implemented. The electronic device 1102 described in connection with FIG. 11 may be an example of one or more of the electronic devices 102, 402 described in connection with FIGS. 1 and 4.

The electronic device 1102 includes one or more microphones 1104, a password evaluation module 1108, a password feedback module 1112 and one or more output devices 1116. One or more of the components included in the electronic device 1102 may correspond to and/or may function similarly to one or more of the components included in one or more of the electronic devices 102, 402 described in connection with one or more of FIGS. 1 and 4.

The electronic device 1102 may include one or more input devices 1166. Examples of input devices 1166 include touchscreens, touchpads, image sensors (e.g., cameras), keyboards (e.g., physical and/or software keyboards), keypads (e.g., physical and/or software keypads, fingerprint scanners, additional microphones, orientation sensors (e.g., tilt sensors), motion sensors (e.g., accelerometers), GPS modules, pressure sensors, etc. The one or more input devices 1166 may obtain or receive one or more inputs 1168. The one or more inputs 1168 may be provided to the password evaluation module 1108.

The one or more microphones 1104 may capture an audio signal 1106. The audio signal 1106 may include an audio password. The audio signal 1106 may be provided to the password evaluation module 1108.

The password evaluation module 1108 may obtain (e.g., receive) the audio signal 1106 captured by the one or more microphones 1104. As described above, the audio signal 1106 may include an audio password. The password evaluation module 1108 may evaluate the strength of the audio password based on measuring one or more unique characteristics of the audio signal 1106. This may be accomplished as described above in connection with one or more of FIGS. 1-2 and 4-8.

The password evaluation module 1108 may optionally include an additional authentication input evaluation module 1170. The additional authentication input evaluation module 1170 may take into account one or more additional authentication inputs 1168 in combination with the audio password. For example, if the audio password is used in conjunction with an alphanumeric code or fingerprint scan, the strength score may reflect additional authentication strength offered by the combination of the audio password and the one or more additional authentication inputs, if utilized. In some configurations, the electronic device 1102 (e.g., password evaluation module 1108) may obtain one or more additional authentication inputs 1168. For example, some configurations may allow for the use of other modalities such as video, gyro/accelerometer sensors, keyboards, fingerprint sensor, etc. In some approaches, one or more such modalities may be utilized for one or more parts (of a phrase, sentence, etc.) with less uniqueness or discrimination strength. For example, when a user utters a word with low uniqueness (e.g., the word "school" with a less discriminative score), the electronic device 1102 may obtain or receive one or more additional authentication inputs 1168.

Examples of the one or more additional authentication inputs 1168 are given as follows. In configurations where the electronic device 1102 has gesture recognition, the electronic device 1102 may receive a gesture (e.g., a touchscreen pattern, touchpad pattern, visual hand gesture pattern captured by a camera, etc.) input by the user. The gesture may be user-created or predefined. In configurations where the electronic device 1102 includes a camera, the electronic device 1102 may capture one or more images of a user, such as a user's face, eyes, nose, lips, face shape and/or more unique information such as an iris with the audio signal 1106. For instance, a camera included in the electronic device 1102 may be pointed (by a user, for example) to capture all or part of the user's face.

In configurations where the electronic device 1102 includes one or more motion and/or orientation sensors (e.g., gyros, accelerometers, tilt sensors, etc.), the electronic device 1102 may obtain motion and/or orientation information. For example, a user may orient and/or move the electronic device 1102 (e.g., phone) in a user-created or predefined way. For instance, the electronic device 1102 may encode gyro and/or accelerometer sensor information together with the audio signal 1106.

In configurations where the electronic device 1102 includes a physical or software (on a touchscreen or display, for example) keypad or keyboard, the electronic device 1102 may receive a numeric code, text and/or alphanumeric string (typed by the user, for example) together with the audio signal 1106. In configurations where the electronic device 1102 includes a fingerprint sensor, the electronic device 1102 may receive a fingerprint (when the user touches or holds the fingerprint sensor, for example).

In configurations where the electronic device 1102 includes multiple microphones 1104, the electronic device 1102 may obtain (e.g., receive and/or determine) spatial directionality information of the audio signal 1106. For example, the user may speak an audio password in a sequence of directions (e.g., top, bottom, left, right, front, back, upper right, lower left, etc.) relative to the electronic device 1102. For instance, the user may say a first word toward the bottom of the electronic device 1102, say a second word toward the top of the electronic device 1102, say a third word toward the left of the electronic device 1102 and say a fourth word toward the right of the electronic device 1102.

Additional detail regarding the spatial directionality information is provided hereafter. In some configurations, the electronic device 1102 may utilize the integration of spatial audio for security. For example, in order to unlock the electronic device 1102, a user may utter a sequence into a certain spatial sector or different spatial sectors (with respect to the electronic device 1102 (e.g., phone), for example).

The electronic device 1102 (e.g., a verification module not shown in FIG. 11) may identify the user (with speaker recognition) and identify whether the sequence of spatial talking directions is correct. Only a combination of sufficiently high speaker recognition likelihood and the correct spatial sequence will unlock the electronic device 1102. For example, the electronic device 1102 may perform verification in some configurations of the spatial audio/speaker recognition feature as follows. The electronic device 1102 may initialize a prompt, receive an utterance from the front of the electronic device 1102, receive an utterance from the left of the electronic device 1102, receive an utterance from the top of the electronic device 1102 and receive an utterance from left of the electronic device 1102. After the initial prompt, the electronic device 1102 (with multiple microphones) provides a predefined sequence of spatial audio pickup. In these configurations, the user may need to know the sequence to utter the audio password (e.g., sentence) into the correct spatial sectors. For example, the user may say: "my favorite"—switch sector—"pet's"—switch sector—"name is"—switch sector—"Barney").

In some configurations, the timing and/or duration of utterance in each spatial sector may be part of the verification procedure (e.g., 2 seconds in the front sector, 5 seconds in the top sector, 3 seconds in the right sector, etc.). For example, the electronic device 1102 may initiate a voice recording process via a voice prompt or by detecting the push of a button or screen. The electronic device 1102 may start listening in different spatial sectors according to a predefined sequence (e.g., a sequence of activated spatial sectors and/or timing (duration) of each spatial sector). If the electronic device 1102 recognizes the true user in each spatial sector (context dependent or independent uttering), the electronic device 1102 grants access.

More specifically, the electronic device 1102 may operate according to the following method or procedure. The electronic device 1102 may initiate a voice recording with a voice prompt and/or when an input is received (of a button or touchscreen, for example). The electronic device 1102 may start listening in different spatial sectors according to predefined sequence. For example, the electronic device 1102 may receive audio in a sequence of activated spatial sectors. In some configurations, the electronic device 1102 may receive audio in accordance with a timing (e.g., duration) sequence in each spatial sector.

If the electronic device 1102 recognizes the true user (e.g., desired speaker) in each spatial sector (context dependent or independent uttering), the electronic device 1102 grants access. For example, the electronic device 1102 may allow a user to access more functionality of the electronic device 1102 (e.g., applications, voice calls, etc.).

In one example, a user may utter a password, passphrase or sequence of words (e.g., "sentence") from one certain direction relative to the device. In another example, the user may utter portions of a sentence in a sequence of directions.

Additionally or alternatively, the user may be required to utter different portions of the sentence with certain timing. Additionally or alternatively, multiple users' voices may be utilized. For example, a first user may utter a password from the left of an electronic safe while a second user may utter a password from the right of the electronic safe in order to unlock the safe. The spatial audio security feature may be implemented independently or in combination with other measures (e.g., face recognition, fingerprint recognition, etc.).

In some configurations, the audio password in combination with the one or more additional authentication inputs may be required to pass multiple criteria for the password (e.g., combined audio password with one or more additional authentication inputs 1168) to be set. For example, the password evaluation module 1108 may require that the audio password provide a minimum uniqueness and that the one or more additional authentication inputs 1168 meet one or more additional criteria. The uniqueness threshold and/or the one or more additional criteria may be weighted.

In some configurations, the additional authentication input evaluation module 1170 may discount one or more thresholds based on the audio signal 1106 and/or the one or more additional authentication inputs 1168. For example, if a fingerprint scan provides additional authentication strength, the password evaluation module 1108 may require a lower uniqueness threshold or audio password strength. Additionally or alternatively, if the audio signal 1106 provides high uniqueness, the password evaluation module 1108 may require lower strength contributed by an additional authentication input 1168. For instance, if the audio signal 1106 offers relatively good uniqueness, the password evaluation module 1108 may suggest that a 2-digit numeric code be utilized. However, if the audio signal 1106 offers relatively weak uniqueness, the password evaluation module 1108 may suggest that a 4-digit numeric code and/or a fingerprint scan be utilized.

The one or more additional authentication inputs 1168 may be utilized with or without timing and/or sequence constraints. In some examples, the one or more additional authentication inputs 1168 may be obtained by the electronic device 1102 any time before, during or after the audio signal 1106 is received.

In other examples, the electronic device 1102 may require (or be configured to require) that the one or more additional authentication inputs 1168 be received with a certain timing constraint and/or in a certain sequence relative to the reception of the audio signal 1106. In one example, the electronic device 1102 may require (or be configured to require) that the one or more additional authentication inputs 1168 be received within a period of time before, during and/or after the audio signal 1106 is received. For instance, the electronic device 1102 may require that an additional authentication input 1168 be received during a weaker speech component of the audio password. Additionally or alternatively, the electronic device 1102 may require (or be configured to require) that the additional authentication input 1168 be received in a particular sequence (e.g., before a speech component, after a speech component, between speech components, in a sequence with other additional authentication input(s), etc.). In some configurations, the electronic device 1102 may add (and/or suggest to add) one or more additional authentication inputs 1168 in an order of increasing complexity. Additionally or alternatively, the electronic device 1102 may require for one or more additional authentication inputs 1168 to be added until the password (e.g., audio password in combination with one or more additional authentication inputs 1168) exceeds a minimum required strength.

In some configurations, the password evaluation module 1108 may optionally include an input degradation module 1172. The input degradation module 1172 may degrade the audio signal 1106 and/or the additional authentication input(s) 1168. For example, the password evaluation module 1108 may remove information from (e.g., downsample, filter out one or more portions of) the audio signal 1106. Additionally or alternatively, the password evaluation module 1108 may remove information from a fingerprint scan or from an image of a user's face or iris.

The password evaluation module 1108 may provide evaluation information 1110 to the password feedback module 1112. The evaluation information 1110 may include information that indicates password strength and/or information obtained in password evaluation. For example, the evaluation information 1110 may include the extracted feature(s), the uniqueness measure, the password strength score and/or other information.

The password feedback module 1112 may provide password feedback 1114. For example, the password feedback module 1112 may inform a user that the audio password is weak based on the evaluation of the strength of the audio password. Providing password feedback 1114 may enable a user to determine (e.g., select, provide or create) an audio password that is sufficiently strong. The password feedback 1114 may include the password strength score, one or more speech component candidates (e.g., recommended or suggested speech component(s)), one or more suggested actions and/or one or more messages. For example, the password feedback 1114 may include the password strength score and a message indicating that the audio password is weak. Additionally or alternatively, the password feedback 1114 may include one or more suggested speech components that the user may utilize to create a stronger audio password. In some configurations, the electronic device 1102 may provide a suggested synthetic (e.g., unknown) word composed of suggested speech components as password feedback 1114. Additionally or alternatively, the password feedback 1114 may include a suggested action that the user may provide an additional authentication input (e.g., text, numeric code, alphanumeric string, spatial directionality, additional biometric (e.g., face scan, iris scan, fingerprint, etc.)).

In some configurations, the password feedback module 1112 may provide one or more password suggestions. For example, the electronic device 1102 (e.g., password feedback module 1112) may identify one or more speech components (e.g., utterances, phonemes, etc.) with high enough uniqueness or distinction from one or more other models (e.g., generic speech model, universal model, UBM, etc.). For example, the password feedback module 1112 may identify the one or more speech components based on the uniqueness of a user's voice for each phoneme via a pair of speech recognition and speaker verification systems. Then, the password feedback module 1112 may generate some possible candidate speech component(s) (e.g., phonemes, syllables, utterances, passwords, etc.) that have high "uniqueness," such that a user may choose one or more candidate speech components to create a password. For example, the electronic device 1102 may display password feedback 1114 such as: "You can use /ah/, /k/, . . . , <triangular>, <qualcomm>, . . . , ." Additionally or alternatively, detailed password feedback 1114 may be provided for the password uttered by a user to strengthen it more (e.g., "Your password has 60% strength. The utterance /eh/ may be replaced by /ah/, . . . .").

In some configurations, the electronic device 1102 (e.g., password feedback module 1112) may provide a password suggestion with multi-modality. As described above, for example, the password feedback module 1112 may provide password feedback 1114 that suggests one or more additional authentication inputs 1168 (e.g., text, numeric code, alphanumeric string, spatial directionality, additional biometric (e.g., face scan, iris scan, fingerprint, etc.)).

The password feedback module 1112 may provide password feedback 1114 to the one or more output devices 1116. The one or more output devices 1116 may accordingly relay or convey the password feedback 1114 to a user. For example, the output device(s) 1116 (e.g., display, touchscreen, speaker, etc.) may relay a label 1174 associated with the strength of the audio password. In some configurations, this may be accomplished via one or more GUIs as described in connection with FIG. 1. In one approach, a display panel may display the password strength score. Additionally or alternatively, a speaker may output an acoustic signal (e.g., text-to-speech) that indicates the password strength score (e.g., "your password is weak," "your password is 60% strong," etc.).

In some configurations, the output device(s) 1116 may relay one or more suggestions (e.g., candidate speech component(s) 1176, additional authentication input option(s) 1178, etc.). For example, a display panel may display one or more candidate speech components 1176, such as phonemes, syllables, words, utterances and/or phrases (e.g., "/ah/, /eh/, /k/, /triangular/, /mirage/"). Additionally or alternatively, a speaker may output an acoustic signal to relay the one or more suggestions (e.g., "please add /ah/, /eh/, /k/, /triangular/, /mirage/ and/or an additional input type to your password").

The use of audio passwords (e.g., independent audio passwords and/or audio passwords with one or more additional authentication inputs 1168 such as spatial directionality, etc.) for security may be applied to many different types of electronic devices 1102 (that may include an array of microphones 1104, for instance). For example, this security feature may be applied to smart phones, tablet devices, electronic door locks, door sensors, cameras, smart keys, laptop computers, desktop computers, gaming systems, cars, payment kiosks (as a way of authenticating a transaction, for example), televisions, audio devices (e.g., mp3 players, iPods, compact disc (CD) players, etc.), audio/video devices (e.g., digital video recorders (DVRs), Blu-ray players, digital video disc (DVD) players, etc.), household appliances, thermostats, safes, etc. Additionally or alternatively, this security feature may be applied remotely (e.g., to a remote device). For example, a user may provide an audio password (e.g., sentence, passphrase, password, etc.) on a smartphone, which may provide authentication credentials or a command to an electronic door lock to unlock/lock a door (e.g., home door, car door, office door, etc.). In another example, the user may provide a spatial audio code on a smartphone, laptop or tablet to authenticate to a remote server for website authentication, transaction (e.g., purchase, banking) authentication, etc.

Figure 12:
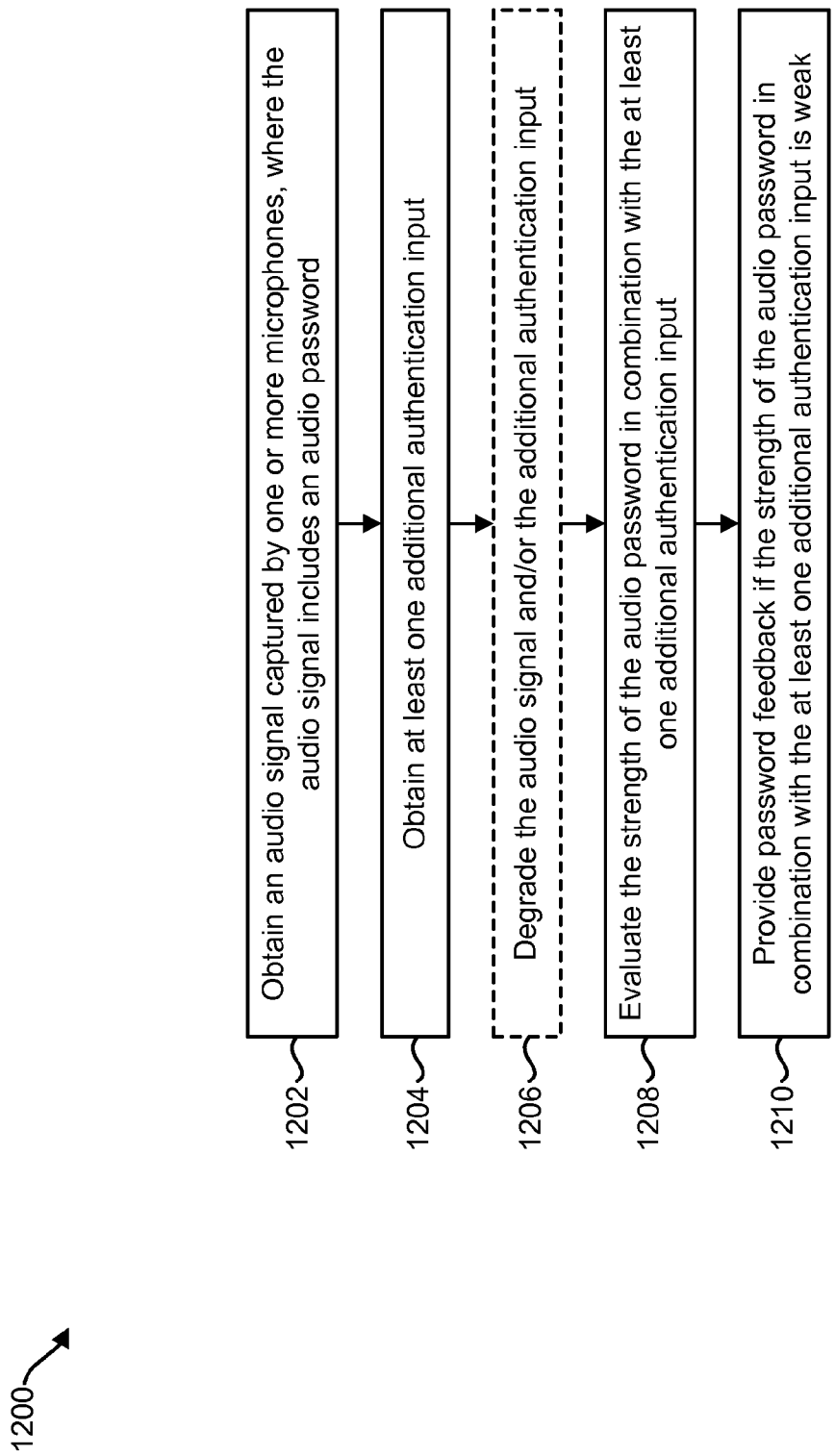
FIG. 12 is a flow diagram illustrating a more specific configuration of a method for evaluating strength of an audio password.

FIG. 12 is a flow diagram illustrating a more specific configuration of a method 1200 for evaluating strength of an audio password. One or more of the electronic devices 102, 402, 1102 described in connection with FIGS. 1, 4 and 11 may perform the method 1200.

The electronic device 1102 may obtain 1202 an audio signal 1106 captured by the one or more microphones 1104. This may be accomplished as described above in connection with one or more of FIGS. 1-2, 4-8 and 11. The audio signal 1106 may include an audio password.

The electronic device 1102 may obtain at least one additional authentication input 1168. This may be accomplished as described above in connection with one or more of the Figures (e.g., FIGS. 1, 4 and 11). For example, the electronic device may obtain 1204 one or more additional authentication inputs 1168 such as text, numeric code, alphanumeric string, spatial directionality and/or additional biometric (such as a fingerprint scan, camera image of a user's face or iris, etc.).

The electronic device 1102 may optionally degrade 1206 the audio signal 1106 and/or the additional authentication input(s) 1168. This may be accomplished as described above in connection with one or more of the Figures (e.g., FIGS. 1, 4 and 11). For example, the electronic device 1102 may remove information from (e.g., downsample, filter out one or more portions of) the audio signal 1106. Additionally or alternatively, the password evaluation module 1108 may remove information from a fingerprint scan or from an image of a user's face or iris.

The electronic device 1102 may evaluate 1208 the strength of the audio password in combination with the at least one additional authentication input 1168. For example, the electronic device 1102 may take into account one or more additional authentication inputs 1168 in combination with the audio password. For instance, if the audio password is used in conjunction with an alphanumeric code or fingerprint scan, the strength score may reflect additional authentication strength offered by the combination of the audio password and the one or more additional authentication inputs.

The electronic device 1102 may provide 1210 password feedback 1114 if the strength of the audio password in combination with the at least one additional authentication input 1168 is weak. This may be accomplished as described above in connection with one or more of FIGS. 1-2, 4-8 and 11. For example, the electronic device 1102 may inform 1206 a user that the audio password is weak based on the evaluation of the strength of the audio password (when the password strength score is not greater than a value, for instance) in combination with the at least one additional authentication input 1168. The password feedback 1114 may include the password strength score, one or more speech component candidates (e.g., recommended or suggested speech component(s)), one or more suggested actions and/or one or more messages. For example, the password feedback 1114 may include the password strength score and a message indicating that the audio password is weak. Additionally or alternatively, the password feedback 1114 may include one or more suggested speech components that the user may utilize to create a stronger audio password. Additionally or alternatively, the password feedback 1114 may include a suggested action that the user may provide an additional authentication input 1168 (e.g., text, numeric code, alphanumeric string, spatial directionality, additional biometric (e.g., face scan, iris scan, fingerprint, etc.)).

Figure 13:
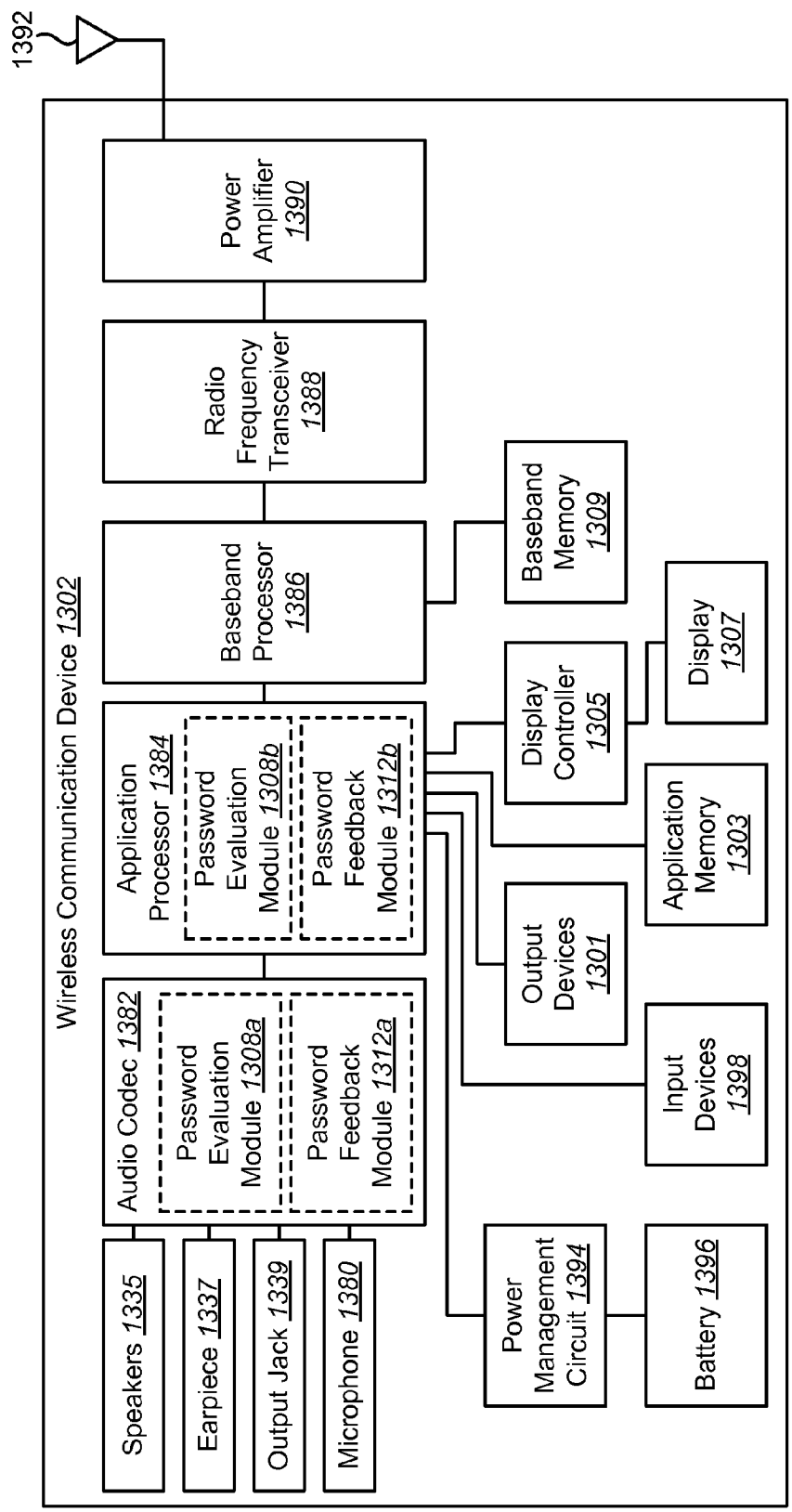
FIG. 13 is a block diagram illustrating one configuration of a wireless communication device in which systems and methods for evaluating strength of an audio password may be implemented.

FIG. 13 is a block diagram illustrating one configuration of a wireless communication device 1302 in which systems and methods for evaluating strength of an audio password may be implemented. The wireless communication device 1302 illustrated in FIG. 13 may be an example of one or more of the electronic devices 102, 402, 1102 described herein. The wireless communication device 1302 may include an application processor 1384. The application processor 1384 generally processes instructions (e.g., runs programs) to perform functions on the wireless communication device 1302. The application processor 1384 may be coupled to an audio coder/decoder (codec) 1382.

The audio codec 1382 may be used for coding and/or decoding audio signals. The audio codec 1382 may be coupled to at least one speaker 1335, an earpiece 1337, an output jack 1339 and/or at least one microphone 1380. The speakers 1335 may include one or more electro-acoustic transducers that convert electrical or electronic signals into acoustic signals. For example, the speakers 1335 may be used to play music or output a speakerphone conversation, etc. The earpiece 1337 may be another speaker or electro-acoustic transducer that can be used to output acoustic signals (e.g., speech signals) to a user. For example, the earpiece 1337 may be used such that only a user may reliably hear the acoustic signal. The output jack 1339 may be used for coupling other devices to the wireless communication device 1302 for outputting audio, such as headphones. The speakers 1335, earpiece 1337 and/or output jack 1339 may generally be used for outputting an audio signal from the audio codec 1382. The at least one microphone 1380 may be an acousto-electric transducer that converts an acoustic signal (such as a user's voice) into electrical or electronic signals that are provided to the audio codec 1382.

In some configurations, the audio codec 1382 may include a password evaluation module 1308a and/or a password feedback module 1312a. Additionally or alternatively, the application processor 1384 may include a password evaluation module 1308b and/or a password feedback module 1312b. The password evaluation module(s) 1308a-b and/or the password feedback module(s) 1312a-b may be examples of the password evaluation module(s) 108, 408, 1108 and/or the password feedback module(s) 112, 412, 1112 described above in connection with one or more of FIGS. 1, 4 and 11. In other configurations, one or more of the password evaluation module 1308a and the password feedback module 1312a may be implemented on the wireless communication device 1302 separately from the audio codec 1382 and the application processor 1384.

The application processor 1384 may also be coupled to a power management circuit 1394. One example of a power management circuit 1394 is a power management integrated circuit (PMIC), which may be used to manage the electrical power consumption of the wireless communication device 1302. The power management circuit 1394 may be coupled to a battery 1396. The battery 1396 may generally provide electrical power to the wireless communication device 1302. For example, the battery 1396 and/or the power management circuit 1394 may be coupled to at least one of the elements included in the wireless communication device 1302.

The application processor 1384 may be coupled to at least one input device 1398 for receiving input. Examples of input devices 1398 include infrared sensors, image sensors, accelerometers, touch sensors, keypads, etc. The input devices 1398 may allow user interaction with the wireless communication device 1302. The application processor 1384 may also be coupled to one or more output devices 1301. Examples of output devices 1301 include printers, projectors, screens, haptic devices, etc. The output devices 1301 may allow the wireless communication device 1302 to produce output that may be experienced by a user.

The application processor 1384 may be coupled to application memory 1303. The application memory 1303 may be any electronic device that is capable of storing electronic information. Examples of application memory 1303 include double data rate synchronous dynamic random access memory (DDRAM), synchronous dynamic random access memory (SDRAM), flash memory, etc. The application memory 1303 may provide storage for the application processor 1384. For instance, the application memory 1303 may store data and/or instructions for the functioning of programs that are run on the application processor 1384.

The application processor 1384 may be coupled to a display controller 1305, which in turn may be coupled to a display 1307. The display controller 1305 may be a hardware block that is used to generate images on the display 1307. For example, the display controller 1305 may translate instructions and/or data from the application processor 1384 into images that can be presented on the display 1307. Examples of the display 1307 include liquid crystal display (LCD) panels, light emitting diode (LED) panels, cathode ray tube (CRT) displays, plasma displays, etc.

The application processor 1384 may be coupled to a baseband processor 1386. The baseband processor 1386 generally processes communication signals. For example, the baseband processor 1386 may demodulate and/or decode received signals. Additionally or alternatively, the baseband processor 1386 may encode and/or modulate signals in preparation for transmission.

The baseband processor 1386 may be coupled to baseband memory 1309. The baseband memory 1309 may be any electronic device capable of storing electronic information, such as SDRAM, DDRAM, flash memory, etc. The baseband processor 1386 may read information (e.g., instructions and/or data) from and/or write information to the baseband memory 1309. Additionally or alternatively, the baseband processor 1386 may use instructions and/or data stored in the baseband memory 1309 to perform communication operations.

The baseband processor 1386 may be coupled to a radio frequency (RF) transceiver 1388. The RF transceiver 1388 may be coupled to a power amplifier 1390 and one or more antennas 1392. The RF transceiver 1388 may transmit and/or receive radio frequency signals. For example, the RF transceiver 1388 may transmit an RF signal using a power amplifier 1390 and at least one antenna 1392. The RF transceiver 1388 may also receive RF signals using the one or more antennas 1392.

Figure 14:
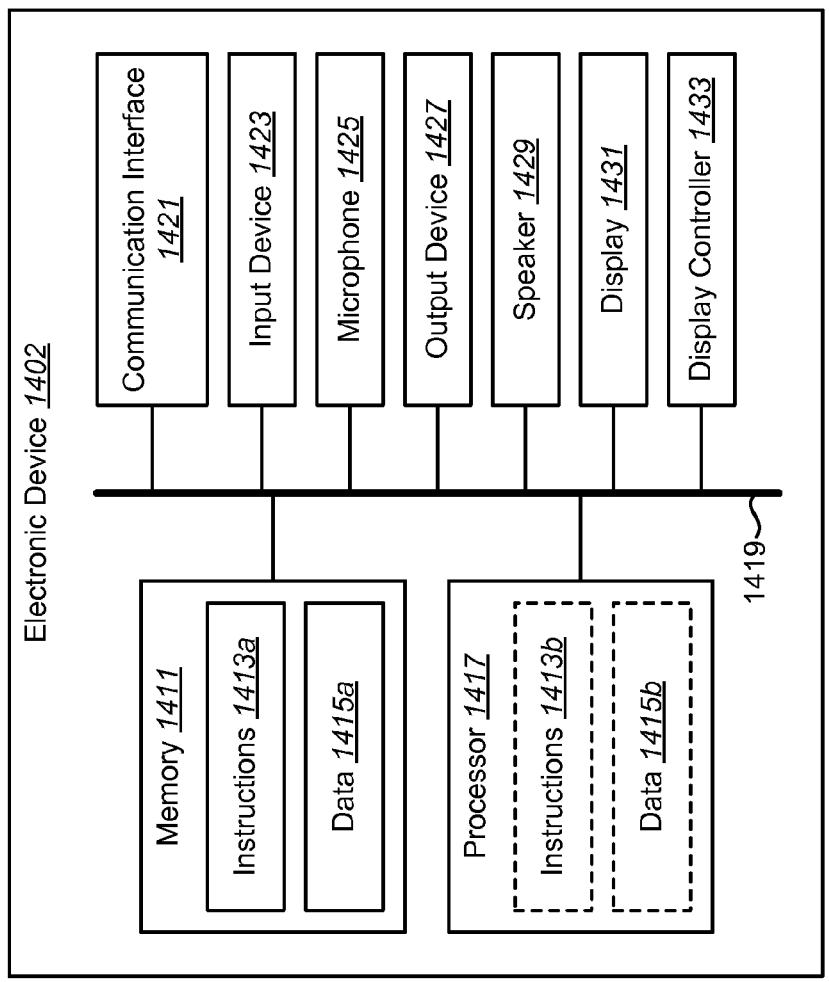
FIG. 14 illustrates various components that may be utilized in an electronic device.

FIG. 14 illustrates various components that may be utilized in an electronic device 1402. The illustrated components may be located within the same physical structure or in separate housings or structures. The electronic device 1402 described in connection with FIG. 14 may be implemented in accordance with one or more of the electronic devices 102, 402, 1102 and wireless communication device 1302 described herein. The electronic device 1402 includes a processor 1417. The processor 1417 may be a general purpose single- or multi-chip microprocessor (e.g., an ARM), a special purpose microprocessor (e.g., a digital signal processor (DSP)), a microcontroller, a programmable gate array, etc. The processor 1417 may be referred to as a central processing unit (CPU). Although just a single processor 1417 is shown in the electronic device 1402 of FIG. 14, in an alternative configuration, a combination of processors (e.g., an ARM and DSP) could be used.

The electronic device 1402 also includes memory 1411 in electronic communication with the processor 1417. That is, the processor 1417 can read information from and/or write information to the memory 1411. The memory 1411 may be any electronic component capable of storing electronic information. The memory 1411 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1415a and instructions 1413a may be stored in the memory 1411. The instructions 1413a may include one or more programs, routines, sub-routines, functions, procedures, etc. The instructions 1413a may include a single computer-readable statement or many computer-readable statements. The instructions 1413a may be executable by the processor 1417 to implement one or more of the methods, functions and procedures described above. Executing the instructions 1413a may involve the use of the data 1415a that is stored in the memory 1411. FIG. 14 shows some instructions 1413b and data 1415b being loaded into the processor 1417 (which may come from instructions 1413a and data 1415a).

The electronic device 1402 may also include one or more communication interfaces 1421 for communicating with other electronic devices. The communication interfaces 1421 may be based on wired communication technology, wireless communication technology, or both. Examples of different types of communication interfaces 1421 include a serial port, a parallel port, a Universal Serial Bus (USB), an Ethernet adapter, an Institute of Electrical and Electronics Engineers (IEEE) 1494 bus interface, a small computer system interface (SCSI) bus interface, an infrared (IR) communication port, a Bluetooth wireless communication adapter, a 3rd Generation Partnership Project (3GPP) transceiver, an IEEE 802.11 ("Wi-Fi") transceiver and so forth. For example, the communication interface 1421 may be coupled to one or more antennas (not shown) for transmitting and receiving wireless signals.

The electronic device 1402 may also include one or more input devices 1423 and one or more output devices 1427. Examples of different kinds of input devices 1423 include a keyboard, mouse, microphone, remote control device, button, joystick, trackball, touchpad, lightpen, etc. For instance, the electronic device 1402 may include one or more microphones 1425 for capturing acoustic signals. In one configuration, a microphone 1425 may be a transducer that converts acoustic signals (e.g., voice, speech) into electrical or electronic signals. Examples of different kinds of output devices 1427 include a speaker, printer, etc. For instance, the electronic device 1402 may include one or more speakers 1429. In one configuration, a speaker 1429 may be a transducer that converts electrical or electronic signals into acoustic signals. One specific type of output device which may be typically included in an electronic device 1402 is a display device 1431. Display devices 1431 used with configurations disclosed herein may utilize any suitable image projection technology, such as a cathode ray tube (CRT), liquid crystal display (LCD), light-emitting diode (LED), gas plasma, electroluminescence, or the like. A display controller 1433 may also be provided for converting data stored in the memory 1411 into text, graphics, and/or moving images (as appropriate) shown on the display device 1431.

The various components of the electronic device 1402 may be coupled together by one or more buses, which may include a power bus, a control signal bus, a status signal bus, a data bus, etc. For simplicity, the various buses are illustrated in FIG. 14 as a bus system 1419. It should be noted that FIG. 14 illustrates only one possible configuration of an electronic device 1402. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for evaluating strength of an audio password by an electronic audio device, comprising:
obtaining a speech signal captured by one or more microphones, wherein the speech signal includes a received audio password comprising a plurality of phonemes;
determining a uniqueness measure of the speech signal over a time period of the speech signal based on a generic speech model, wherein the generic speech model represents speech of a group of people;
determining time portions of the uniqueness measure corresponding to the plurality of phonemes;
calculating a uniqueness value of each of the time portions of the uniqueness measure, wherein each uniqueness value indicates a degree of distinction relative to the generic speech model;
identifying one or more of the plurality of phonemes having a uniqueness value greater than a threshold;
determining one or more recommended audio phonemes based on the identified one or more of the plurality of phonemes having a uniqueness value greater than the threshold;
outputting a recommended audio password based on the one or more recommended audio phonemes, wherein the recommended audio password has a greater password strength score than the received audio password; and
authenticating a user based on the recommended audio password to grant access to one or more functions.

2. The method of claim 1, wherein the outputting comprises outputting a plurality of recommended audio passwords.

3. The method of claim 1, wherein the recommended audio password is a synthetic recommended audio password that comprises one or more phonemes from the received audio password and the one or more recommended audio phonemes.

4. The method of claim 1, wherein the recommended audio password is a multi-modal password that comprises one or more alphanumeric or biometric authentication inputs.

5. The method of claim 1, further comprising outputting a message that one of the phonemes in the received audio password be replaced with a recommended audio phoneme.

6. The method of claim 1, wherein the uniqueness values are likelihood ratios between a user's speech and a universal background model.

7. The method of claim 1, further comprising obtaining at least one additional authentication input.

8. The method of claim 7, further comprising degrading at least one of the speech signal and the additional authentication input.

9. The method of claim 1, wherein characteristics of the user comprise one or more of a geographical location, a user age, a user gender, a user language, and a regional dialect.

10. An electronic audio device for evaluating strength of an audio password, comprising:
one or more microphones configured to capture a speech signal, wherein the speech signal includes a received audio password comprising a plurality of phonemes;
password evaluation circuitry coupled to the one or more microphones, wherein the password evaluation circuitry is configured to determine a uniqueness measure of the speech signal over a time period of the speech signal based on a generic speech model, wherein the generic speech model represents speech of a group of people, to determine time portions of the uniqueness measure corresponding to the plurality of phonemes, to calculate a uniqueness value of each of the time portions of the uniqueness measure, wherein each uniqueness value indicates a degree of distinction relative to the generic speech model, and to identify one or more of the plurality of phonemes having a uniqueness value greater than a threshold;
password feedback circuitry coupled to the password evaluation circuitry, wherein the password feedback circuitry is configured to:
determine one or more recommended audio phonemes based on the identified one or more of the plurality of phonemes having a uniqueness value greater than the threshold; and
determine a recommended audio password based on the one or more recommended audio phonemes, wherein the recommended audio password has a greater password strength score than the received audio password; and
an output device coupled to the password feedback circuitry, wherein the output device is configured to output the recommended audio password, wherein the electronic audio device is configured to authenticate a user based on the recommended audio password to grant access to one or more functions.

11. The electronic audio device of claim 10, wherein the outputting comprises outputting a plurality of recommended audio passwords.

12. The electronic audio device of claim 10, wherein the recommended audio password is a synthetic recommended audio password that comprises one or more phonemes from the received audio password and the one or more recommended audio phonemes.

13. The electronic audio device of claim 10, wherein the recommended audio password is a multi-modal password that comprises one or more alphanumeric or biometric authentication inputs.

14. The electronic audio device of claim 10, wherein the output device is configured to display a message that one of the phonemes in the received audio password be replaced with a recommended phoneme.

15. The electronic audio device of claim 10, wherein the uniqueness values are likelihood ratios between a user's speech and a universal background model.

16. The electronic audio device of claim 10, further comprising one or more input devices coupled to the password evaluation circuitry, wherein the one or more input devices are configured to obtain at least one additional authentication input.

17. The electronic audio device of claim 16, wherein the password evaluation circuitry is configured to degrade at least one of the speech signal and the additional authentication input.

18. The electronic audio device of claim 10, wherein characteristics of the user comprise one or more of a geographical location, a user age, a user gender, a user language, and a regional dialect.

19. A computer-program product for evaluating strength of an audio password, comprising a non-transitory tangible computer-readable medium having instructions thereon, the instructions comprising:
  code for causing an electronic audio device to obtain a speech signal captured by one or more microphones, wherein the speech signal includes a received audio password comprising a plurality of phonemes;
  code for causing the electronic device to determine a uniqueness measure of the speech signal over a time period of the speech signal based on a generic speech model, wherein the generic speech model represents speech of a group of people;
  code for causing the electronic device to determine time portions of the uniqueness measure corresponding to the plurality of phonemes;
  code for causing the electronic device to calculate a uniqueness value of each of the time portions of the uniqueness measure, wherein each uniqueness value indicates a degree of distinction relative to the generic speech model;
  code for causing the electronic audio device to identify one or more of the plurality of phonemes having a uniqueness value greater than a threshold;
  code for causing the electronic audio device to determine one or more recommended audio phonemes based on the identified one or more of the plurality of phonemes having a uniqueness value greater than the threshold;
  code for causing the electronic audio device to output a recommended audio password based on the one or more recommended audio phonemes, wherein the recommended audio password has a greater password strength score than the received audio password; and
  code for causing the electronic audio device to authenticate a user based on the recommended audio password to grant access to one or more functions.

20. The computer-program product of claim 19, wherein the recommended audio password is a synthetic recommended audio password that comprises one or more phonemes from the received audio password and the one or more recommended phonemes.

21. The computer-program product of claim 19, wherein the recommended audio password is a multi-modal password that comprises one or more alphanumeric or biometric authentication inputs.

22. The computer-program product of claim 19, further comprising code for causing the electronic audio device to obtain at least one additional authentication input.

23. An electronic audio device for evaluating strength of an audio password, comprising:
  means for obtaining a speech signal, wherein the speech signal includes a received audio password comprising a plurality of phonemes;
  means for determining a uniqueness measure of the speech signal over a time period of the speech signal based on a generic speech model, wherein the generic speech model represents speech of a group of people;
  means for determining time portions of the uniqueness measure corresponding to the plurality of phonemes;
  means for calculating a uniqueness value of each of the time portions of the uniqueness measure, wherein each uniqueness value indicates a degree of distinction relative to the generic speech model;
  means for identifying one or more of the plurality of phonemes having a uniqueness value greater than a threshold;
  means for determining one or more recommended audio phonemes based on the identified one or more of the plurality of phonemes having a uniqueness value greater than the threshold;
  means for outputting a recommended audio password based on the one or more recommended audio phonemes, wherein the recommended audio password has a greater password strength score than the received audio password; and
  means for authenticating a user based on the recommended audio password to grant access to one or more functions.

24. The electronic audio device of claim 23, wherein the recommended audio password is a synthetic recommended audio password that comprises one or more phonemes from the received audio password and the one or more recommended audio phonemes.

25. The electronic audio device of claim 23, wherein the recommended audio password is a multi-modal password that comprises one or more alphanumeric or biometric authentication inputs.

26. The electronic audio device of claim 23, further comprising means for obtaining at least one additional authentication input.

27. The method of claim 1, wherein the recommended audio password further comprises the one or more of the plurality of phonemes having a uniqueness value greater than the threshold.

28. The electronic audio device of claim 10, wherein the recommended audio password further comprises the one or more of the plurality of phonemes having a uniqueness value greater than the threshold.

29. The computer-program product of claim 19, wherein the recommended audio password further comprises the one or more of the plurality of phonemes having a uniqueness value greater than the threshold.

30. The electronic audio device of claim 23, wherein the recommended audio password further comprises the one or more of the plurality of phonemes having a uniqueness value greater than the threshold.

31. The method of claim 1, further comprising aligning an occurrence of the plurality of phonemes with the uniqueness value in time.

* * * * *